US008502875B2

(12) United States Patent
Matsuda et al.

(10) Patent No.: US 8,502,875 B2
(45) Date of Patent: Aug. 6, 2013

(54) CAPTURED IMAGE PROCESSING SYSTEM, PORTABLE TERMINAL APPARATUS, IMAGE OUTPUT APPARATUS, AND METHOD FOR CONTROLLING CAPTURED IMAGE PROCESSING SYSTEM

(75) Inventors: Toyohisa Matsuda, Osaka (JP); Makoto Hayasaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 312 days.

(21) Appl. No.: 13/004,094

(22) Filed: Jan. 11, 2011

(65) Prior Publication Data

US 2011/0169969 A1 Jul. 14, 2011

(30) Foreign Application Priority Data

Jan. 13, 2010 (JP) ................................ 2010-005254

(51) Int. Cl.
*H04N 5/225* (2006.01)
*H04N 5/232* (2006.01)

(52) U.S. Cl.
USPC ....................................... 348/207.2; 348/352

(58) Field of Classification Search
USPC .......... 348/207.1, 207.2, 211.2, 222.1, 208.2, 348/352; 358/1.1
See application file for complete search history.

(56) References Cited

U.S. PATENT DOCUMENTS 5,920,657 A 7/1999 Bender et al.
6,055,530 A 4/2000 Sato
6,178,270 B1 1/2001 Taylor et al.
6,400,845 B1 6/2002 Volino
7,027,087 B2 * 4/2006 Nozaki et al. ............ 348/231.99
7,113,204 B2 * 9/2006 Eto et al. .................. 348/208.99
7,343,049 B2 3/2008 Butterworth
7,352,919 B2 4/2008 Zhou et al.
7,586,655 B1 9/2009 Uhlik et al.

(Continued)

FOREIGN PATENT DOCUMENTS

JP 2002-41502 A 2/2002
JP 2006-25037 A 1/2006

(Continued)

OTHER PUBLICATIONS

Saito, Super-resolution Oversampling from a Single Image, ITE Journal vol. 62, No. 2 (2008) pp. 181-189, The Institute of Image Information Television.

(Continued)

*Primary Examiner* — Trung Diep
(74) *Attorney, Agent, or Firm* — Birch, Stewart, Kolasch & Birch, LLP

(57) ABSTRACT

A captured image processing system includes a portable terminal apparatus and an image output apparatus. The portable terminal apparatus captures images consecutively while detecting a change in position of the portable terminal apparatus during the image capture, and transmits, to the image output apparatus, (i) a plurality of captured image data and (ii) motion information on the change in position detected for each of the plurality of captured image data. The output apparatus receives, from the portable terminal apparatus, the plurality of captured image data and the motion information, carries out, in accordance with the motion information, a positioning process in which the plurality of captured image data are positionally adjusted, prepares, by use of the plurality of captured image data subjected to the positioning process, high resolution image data, and outputs the high resolution image data prepared or an image displayed based on the high resolution image data.

12 Claims, 16 Drawing Sheets

U.S. PATENT DOCUMENTS

| | | | | |
|---|---|---|---|---|
| 2001/0030693 | A1 | 10/2001 | Fisher et al. | |
| 2002/0037100 | A1 | 3/2002 | Toda et al. | |
| 2002/0075389 | A1 | 6/2002 | Seeger et al. | |
| 2007/0008499 | A1 | 1/2007 | Iketani et al. | |
| 2007/0177027 | A1 * | 8/2007 | Nakamura et al. | 348/222.1 |
| 2007/0273750 | A1 | 11/2007 | Tanaka | |
| 2007/0296829 | A1 | 12/2007 | Nakamura et al. | |
| 2008/0298639 | A1 | 12/2008 | Tsunekawa et al. | |
| 2009/0051766 | A1 | 2/2009 | Shimbo et al. | |
| 2009/0052804 | A1 | 2/2009 | Lewis | |
| 2009/0102931 | A1 * | 4/2009 | Yoshikawa et al. | 348/207.2 |
| 2009/0323134 | A1 | 12/2009 | Megawa | |
| 2010/0245604 | A1 | 9/2010 | Ohmiya et al. | |

FOREIGN PATENT DOCUMENTS

| | | | |
|---|---|---|---|
| JP | 2006-140885 | A | 6/2006 |
| JP | 2006-237757 | A | 9/2006 |
| JP | 2007-27839 | A | 2/2007 |
| JP | 2008-187750 | A | 8/2008 |
| JP | 2008-294950 | A | 12/2008 |
| JP | 2009-44538 | A | 2/2009 |
| WO | WO 2005/024723 | A1 | 3/2005 |
| WO | WO 2009/072264 | A1 | 6/2009 |

OTHER PUBLICATIONS

Tanaka et al., "Super-resolution: High-resolution Image Reconstruction from Multiple Low-Resolution Images", ITE Journal vol. 62, No. 3 (2008) pp. 337-342.

Tomasi et al., "Bilateral Filtering for Gray and Color Images", Proceedings of the 1998 IEEE International Conference on Computer Vision, Bombay, India.

Office Action mailed Mar. 16, 2012 from U.S. Appl. No. 12/752,503.

* cited by examiner

F I G. 1
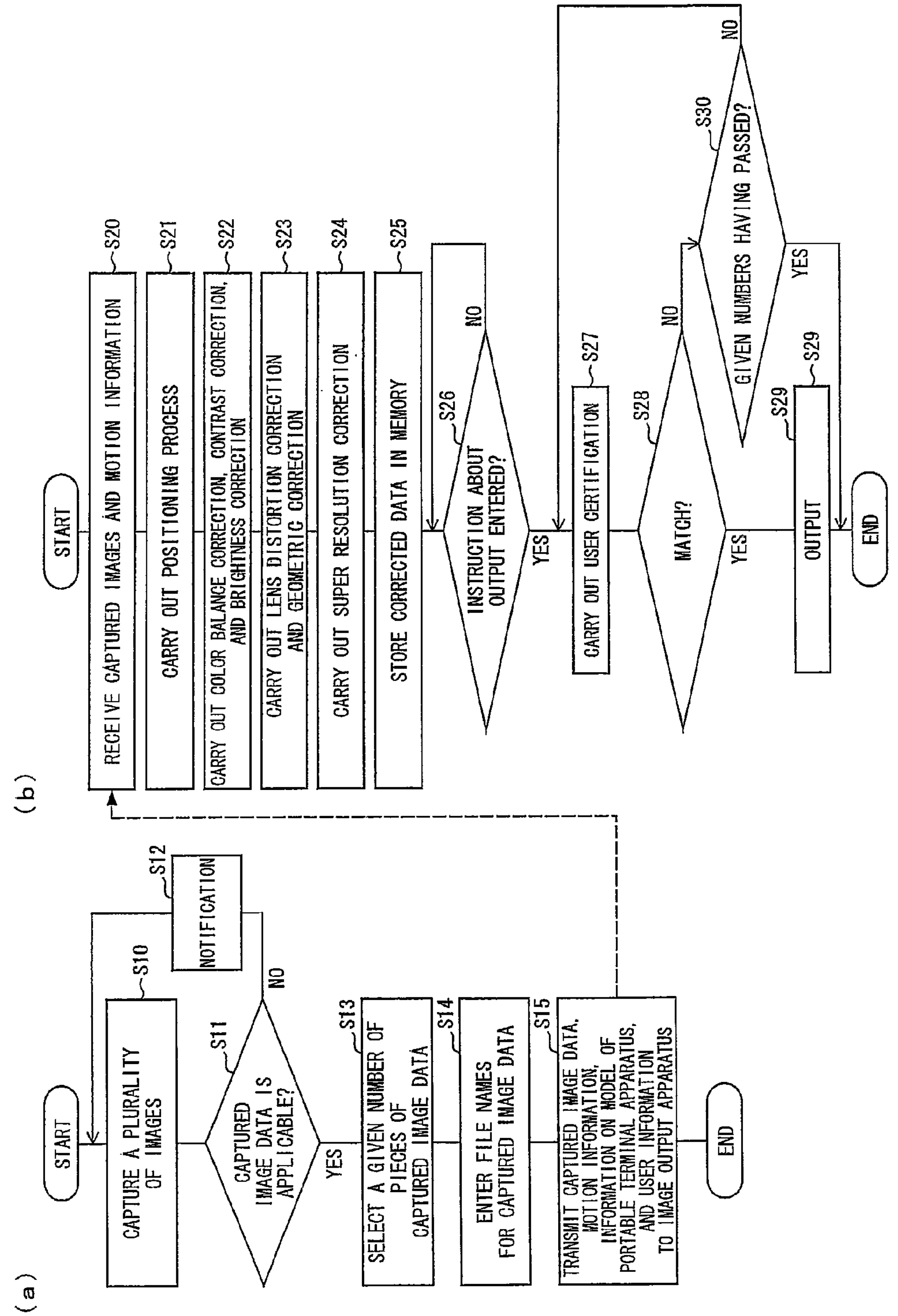

F I G. 2
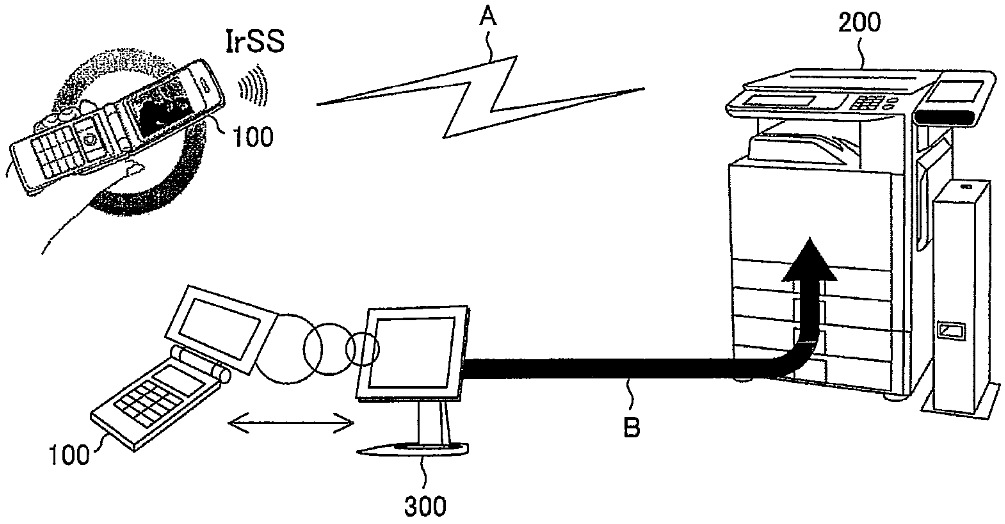

F I G. 3
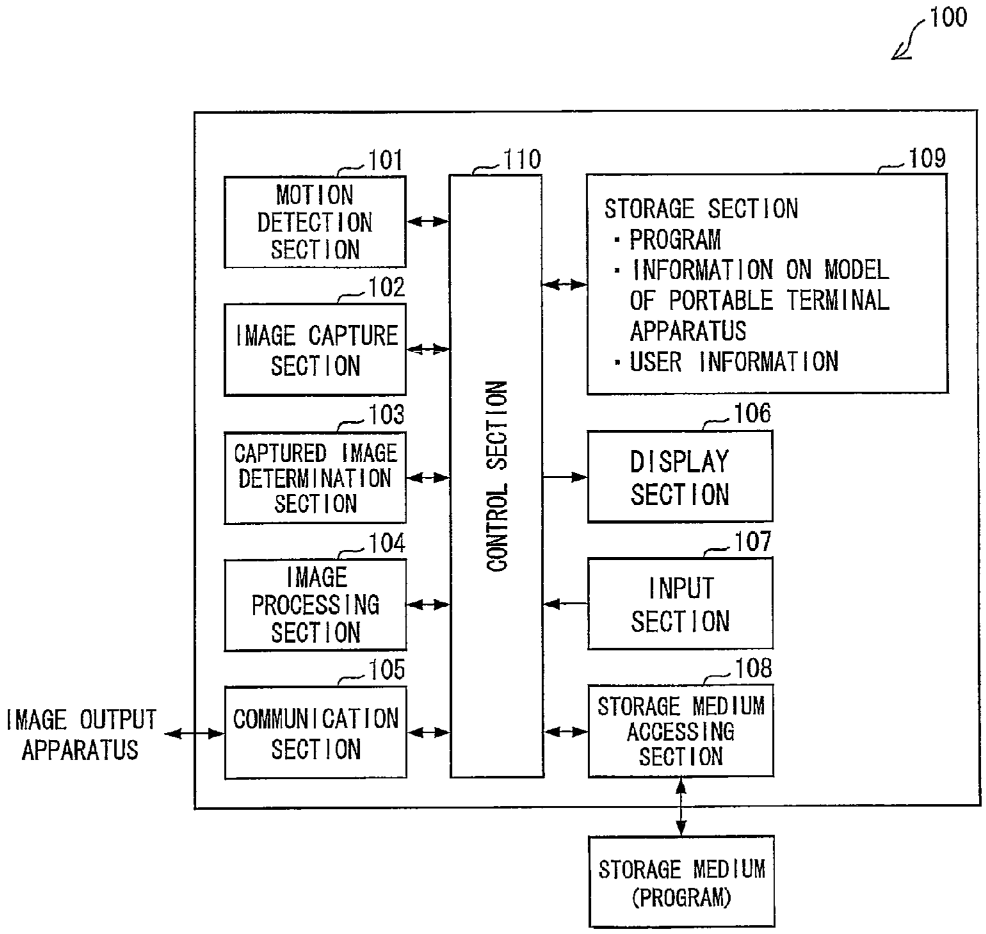

F I G. 6
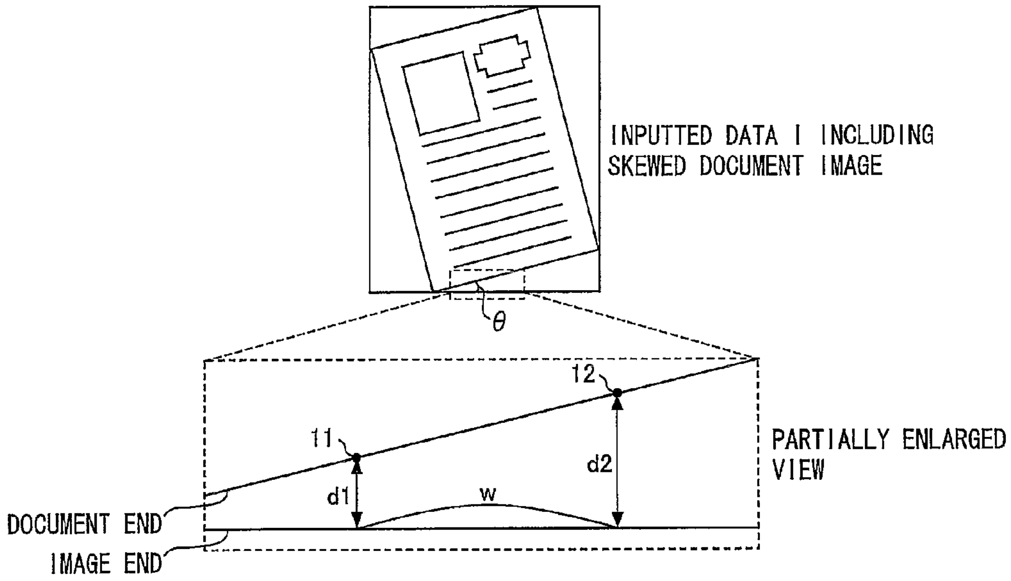

F I G. 7

| tanΘ | Θ |
|---|---|
| -0. 17632698 | -10. 0 |
| -0. 17452794 | -9. 9 |
| -0. 17272999 | -9. 8 |
| -0. 17093313 | -9. 7 |
| -0. 16913734 | -9. 6 |
| -0. 16734261 | -9. 5 |
| -0. 16554893 | -9. 4 |
| : | : |
| 0. 16554893 | 9. 4 |
| 0. 16734261 | 9. 5 |
| 0. 16913734 | 9. 6 |
| 0. 17093313 | 9. 7 |
| 0. 17272999 | 9. 8 |
| 0. 17452794 | 9. 9 |
| 0. 17632698 | 10. 0 |

F I G. 1 4
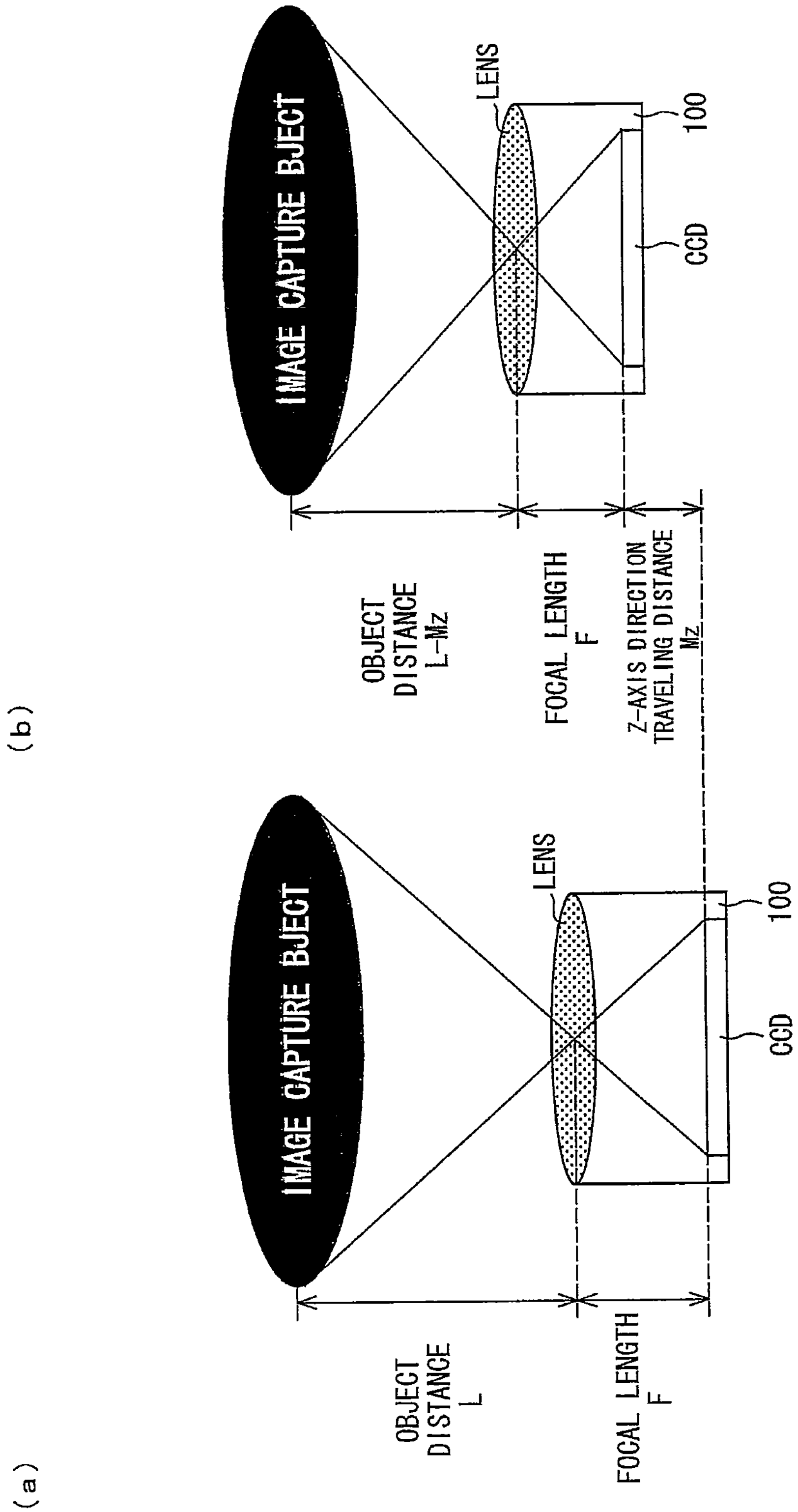

F I G. 1 7
| | |
|---|---|
| MN | 0 |
| MN+⊿ | 1 |
| MN+⊿×2 | 2 |
| MN+⊿×3 | 3 |
| MN+⊿×4 | 4 |
| : | : |
| : | : |
| MN+⊿×255 | 255 |
⊿=(MX−MN)/255
F I G. 1 8
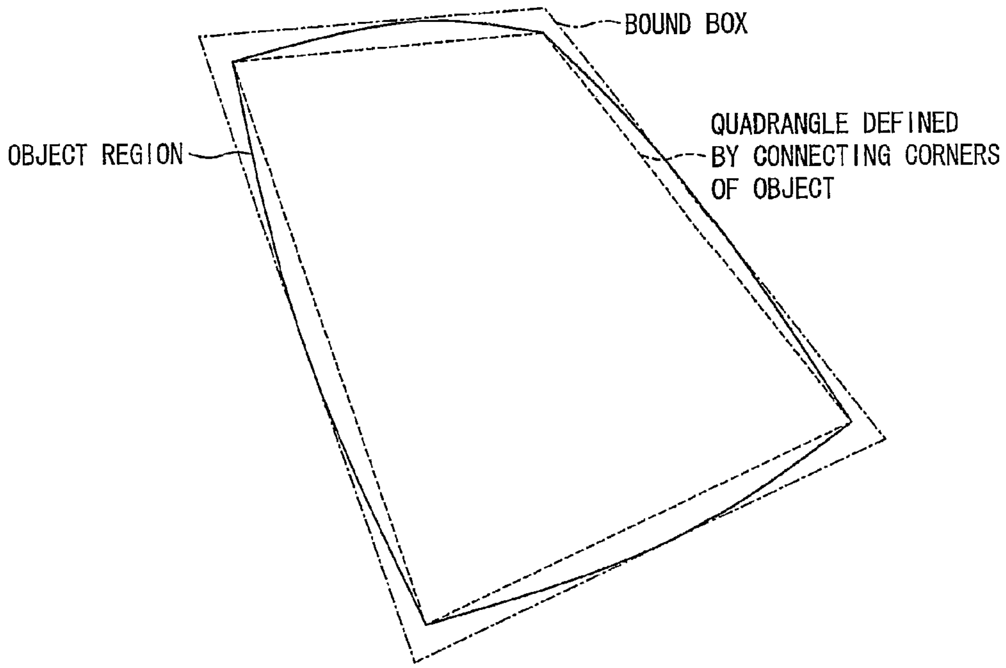

CAPTURED IMAGE PROCESSING SYSTEM, PORTABLE TERMINAL APPARATUS, IMAGE OUTPUT APPARATUS, AND METHOD FOR CONTROLLING CAPTURED IMAGE PROCESSING SYSTEM

This Nonprovisional application claims priority under 35 U.S.C. §119(a) on Patent Application No. 2010-005254 filed in Japan on Jan. 13, 2010, the entire contents of which are hereby incorporated by reference.

BACKGROUND OF THE INVENTION

1. Field of the Invention

The present invention relates to a captured image processing system which causes an image output apparatus to output an image captured by a portable terminal apparatus.

2. Description of the Related Art

With the development of Internet technology, chances are increasing to capture images by use of a camera-equipped mobile device such as a mobile phone. Further, chances are also increasing to use a camera-equipped mobile device for image capture of not only landscapes and people, but also explanation diagrams and/or descriptions displayed in various events, and furthermore slides used in an academic conference and the like.

However, a resolution of an image of the entire approximately A4 paper is much lower in a case where the image is captured by a general camera-equipped mobile device is than in a case where the image is scanned by a flathead scanner. For this reason, research is being done in the technique of carrying out a super resolution process with respect to an image captured by a camera-equipped mobile device, so as to obtain a high-definition image.

Note here that the super resolution process is a process in which a high resolution image is prepared from a plurality of offset low resolution images and various methods for carrying out the super resolution process have been suggested such as an ML (Maximum-likelihood) method, a MAP (Maximum A Posterior) method, and the like.

The ML method is a method in which a square error between (i) a pixel value of a low resolution image which pixel value is estimated from a high resolution image vector h and (ii) a pixel value f of an actually observed low resolution image is an evaluation function, so as to assume a high resolution image which minimizes the evaluation function. Assuming that a transformation matrix for estimating the pixel value of the low resolution image from the high resolution image vector h is A, the evaluation function is represented by the following equation (1).

[Math. 1]

$$\text{Evaluation function} = \sum_{i=1}^{M} |f_i - A_i h|^2 \quad \text{Equation (1)}$$

In the equation (1), M denotes the total number of observation points, $f_i$ denotes an image value of the low resolution image at an ith observation point, and $A_i$ denotes a transformation matrix for estimating the pixel value of the low resolution image at the ith observation point from the high resolution image vector h.

The MAP method is a method for estimating a high resolution image which minimizes an evaluation function which is obtained by adding probability information of the high resolution image to the evaluation function used in the ML method.

Such a super resolution process requires capturing a plurality of images while displacing an image capture device at smaller intervals than pixel intervals. This often requires a complicated system which is capable of accurately controlling an image capture apparatus and causes a problem that it is difficult to arrange such a system at low cost.

In contrast, Patent Literature 1 discloses the technique in which image capture with pixel sliding is carried out without the need of control for accurately displacing an image capture device at smaller intervals than pixel intervals, so as to prepare a high resolution image by use of a plurality of low resolution images. An image capture system disclosed in Patent Literature 1 includes state change detection means for detecting a change in state of an image capture apparatus and makes it possible to carry out image capture at a timing at which a motion velocity of the image capture apparatus itself is lower than a given value. According to this, image capture with pixel sliding is carried out by use of a random motion such as a camera shake or motion means such as a spring, so as to prepare, by the super resolution process, a high resolution image from a plurality of low resolution images.

CITATION LIST

Patent Literature 1

Japanese Patent Application Publication, Tokukai, No. 2006-140885 A (Publication Date: Jun. 1, 2006)

SUMMARY OF INVENTION

Technical Problem

Note here that in the super resolution process, a high resolution image is first assumed and then a high resolution image in which a difference between (i) a low resolution image estimated from the assumed high resolution image and (ii) an actually observed low resolution image is small is searched for based on a point spread function obtained by offset information and an image capturing characteristic. Therefore, in order to enhance a speed and accuracy of the super resolution process, it is necessary to find out an accurate amount of offset between a plurality of observed images.

However, it is often insufficient to estimate only a parallel displacement component since an offset between images includes not only a simple parallel displacement but also a rotation of an image capture apparatus and a scale variance. Therefore, a positioning process which is carried out by use of a correlation between image data as in the case of Patent Literature 1 has a problem that the positioning process, which is complicated, requires much time.

The present invention has been made in view of the conventional problems, and an object of the present invention is to realize a captured image processing system which allows preparation of high resolution image data from a plurality of pieces of captured image data at a higher speed and with greater accuracy.

Solution to Problem

In order to attain the object, a captured image processing system of the present invention includes: a portable terminal apparatus; and an image output apparatus, the portable terminal apparatus transmitting, to the image output apparatus, a plurality of pieces of captured image data captured by the portable terminal apparatus, the image output apparatus outputting high resolution image data prepared in accordance with the plurality of pieces of captured image data received from the portable terminal apparatus or outputting an image displayed based on the high resolution image data, the portable terminal apparatus including: an image capture section for capturing images of an identical object consecutively more than once; a motion detection section for detecting a change in position of the portable terminal apparatus relative to the identical object whose images are being captured, the change occurring while the images are being captured; and a transmission section for transmitting, to the image output apparatus, (i) a plurality of pieces of captured image data obtained from the image capture carried out by the image capture section consecutively more than once and (ii) motion information on the change in position which change has been detected by the motion detection section for each of the plurality of pieces of captured image data, the image output apparatus including: a receiving section for receiving, from the portable terminal apparatus, the plurality of pieces of captured image data and the motion information; a positioning processing section for carrying out, in accordance with the motion information received by the receiving section, a positioning process in which a coordinate conversion is carried out with respect to the plurality of pieces of captured image data received by the receiving section so that the identical object in each of the plurality of pieces of captured image data is positionally adjusted; a super resolution processing section for preparing, by use of the plurality of pieces of captured image data which have been subjected to the coordinate conversion, high resolution image data which has a higher resolution than the plurality of pieces of captured image data; and an output section for outputting the high resolution image data prepared by the super resolution processing section or outputting an image displayed based on the high resolution image data.

According to the invention, the portable terminal apparatus causes the transmission section to transmit, to the image output apparatus, (i) a plurality of pieces of captured image data obtained from the image capture carried out by the image capture section and (ii) motion information on the change in position which change has been detected by the motion detection section for each of the plurality of pieces of captured image data.

Further, the image output apparatus receives, from the portable terminal apparatus, the plurality of pieces of captured image data and the motion information. Then, the image output apparatus causes the positioning processing section to carry out, in accordance with the received motion information, a positioning process in which an affine transformation coefficient is estimated, so as to carry out a coordinate conversion so that the identical object in each of the plurality of pieces of captured image data is positionally adjusted. In addition, the image output apparatus causes the super resolution processing section to prepare, by use of the plurality of pieces of captured image data which have been subjected to the coordinate conversion by the positioning processing section, high resolution image data which has a higher resolution than the plurality of pieces of captured image data. Thereafter, the image output apparatus causes the output section to output the high resolution image data prepared or an image displayed based on the high resolution image data.

As described earlier, according to the invention, the positioning processing section carries out, in accordance with the motion information on the change in position which change has been detected by the motion detection section and by use of an affine transformation coefficient, a positioning process in which a coordinate conversion is carried out with respect to the plurality of pieces of captured image data received by the receiving section so that the identical object in each of the plurality of pieces of captured image data is positionally adjusted. Therefore, such a positioning process can be carried out in a shorter time and with greater accuracy than the conventional positioning process which is carried out by use of a correlation between captured image data.

This can realize a captured image processing system which allows preparation of high resolution image data from a plurality of pieces of captured image data at a higher speed and with greater accuracy.

Advantageous Effects of Invention

As described earlier, a captured image processing system of the present invention includes: a portable terminal apparatus; and an image output apparatus, the portable terminal apparatus transmitting, to the image output apparatus, a plurality of pieces of captured image data captured by the portable terminal apparatus, the image output apparatus outputting high resolution image data prepared in accordance with the plurality of pieces of captured image data received from the portable terminal apparatus or outputting an image displayed based on the high resolution image data, the portable terminal apparatus including: an image capture section for capturing images of an identical object consecutively more than once; a motion detection section for detecting a change in position of the portable terminal apparatus relative to the identical object whose images are being captured, the change occurring while the images are being captured; and a transmission section for transmitting, to the image output apparatus, (i) a plurality of pieces of captured image data obtained from the image capture carried out by the image capture section consecutively more than once and (ii) motion information on the change in position which change has been detected by the motion detection section for each of the plurality of pieces of captured image data, the image output apparatus including: a receiving section for receiving, from the portable terminal apparatus, the plurality of pieces of captured image data and the motion information; a positioning processing section for carrying out, in accordance with the motion information received by the receiving section, a positioning process in which a coordinate conversion is carried out with respect to the plurality of pieces of captured image data received by the receiving section so that the identical object in each of the plurality of pieces of captured image data is positionally adjusted; a super resolution processing section for preparing, by use of the plurality of pieces of captured image data which have been subjected to the coordinate conversion, high resolution image data which has a higher resolution than the plurality of pieces of captured image data; and an output section for outputting the high resolution image data prepared by the super resolution processing section or outputting an image displayed based on the high resolution image data.

This brings about an effect of providing a captured image processing system which allows preparation of high resolution image data from a plurality of pieces of captured image data at a higher speed and with greater accuracy.

BRIEF DESCRIPTION OF DRAWINGS

FIG. 1 is a flow chart illustrating a captured image processing method carried out in a captured image processing system of the present invention. (a) of FIG. 1 illustrates a flow in a portable terminal apparatus, and (b) of FIG. 1 illustrates a flow in an image output apparatus.

FIG. 2 is a drawing illustrating an overall arrangement of the captured image processing system of the present invention.

FIG. 3 is a block diagram illustrating an arrangement of a portable terminal apparatus of the present embodiment.

FIG. 4(*b*), which is a schematic view illustrating the motion of the portable terminal apparatus illustrated in FIG. 3, shows the motion detected by an angular velocity sensor of the motion detection section.

FIG. 5(*b*), which is a schematic view illustrating the geometric change in captured image data relative to the three axes illustrated in FIG. 4(*b*), shows a state of the captured image data in which state the y-axis is rotated.

FIG. 5(*c*), which is a schematic view illustrating the geometric change in captured image data relative to the three axes illustrated in FIG. 4(*b*), shows a state of the captured image data in which state the z-axis is rotated.

FIG. 6 is a schematic view illustrating an example of detection of a skew of an image which detection is carried out in a captured image processing method of the present embodiment.

FIG. 7 is a table showing a relationship between angles of a skew θ and their respective tangents, the angles being obtained in the example of detection of the skew which example is illustrated in FIG. 6.

FIG. 14 has schematic views each illustrating a relationship between a focal length and an object distance of the portable terminal apparatus illustrated in FIG. 3. (a) of FIG. 14 illustrates the relationship between the focal length and the object distance which are obtained during capture of a reference image, and (b) of FIG. 14 illustrates the relationship between the focal length and the object distance which are obtained after the portable terminal apparatus has moved toward the image capture object.

FIG. 17 illustrates an example of a look-up table used during detection of a color balance of an image.

FIG. 18 is a schematic view illustrating an example of a correction for a lens distortion of captured image data which correction is carried out by the lens distortion correction section illustrated in FIG. 13.

DETAILED DESCRIPTION OF THE INVENTION

Figure 4A:
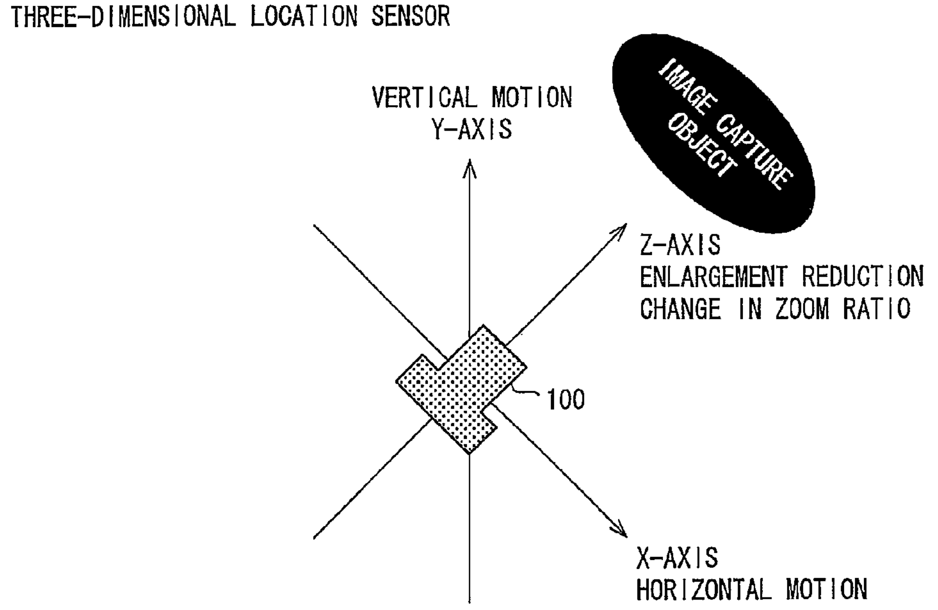
FIG. 4(*a*), which is a schematic view illustrating a motion of the portable terminal apparatus illustrated in FIG. 3, shows the motion detected by a three-dimensional location sensor of a motion detection section.

An embodiment of the present invention is described below with reference to FIGS. 1 through 20.

(1) Overall Arrangement of Captured Image Processing System

FIG. 2 is a drawing illustrating an overall arrangement of a captured image processing system of the present invention. The captured image processing system includes (i) a portable terminal apparatus 100 including image capture means such as a camera-equipped mobile phone or a digital still camera and (ii) an image output apparatus 200 such as a multifunction printer which has a plurality of functions such as a fax machine, a copying machine, a printer, and a scanner (see FIG. 2).

The portable terminal apparatus 100 is carried with a user. The user can cause the portable terminal apparatus 100 to carry out image capture with respect to an object in various scenes. However, an image captured by the portable terminal apparatus 100 has a low resolution as described earlier. Therefore, even in a case where an image having such a low resolution is subjected to an image output process (e.g., printing) by the image output apparatus 200, it may be impossible to recognize details of the image. For example, in a case where image capture is carried out with respect to (a) paper or a poster on which a text image (e.g., a text) is printed or (b) a display screen on which the text image or the like is displayed, the text which has been subjected to the image output process may be illegible. According to the present embodiment, it is possible to obtain an image which has a higher resolution than an image captured by the portable terminal apparatus 100, even in such a case.

According to the present embodiment, the portable terminal apparatus 100 has a function of a text image capture mode in which it is possible to obtain, from the image output apparatus 200, an image which has a higher resolution than an actually captured image.

Note, in the present embodiment, that the user is assumed to select the text image capture mode, in a case where (i) the user carries out image capture with respect to an image capture object (an object whose image is to be captured) which has a rectangular shape such as (a) paper or a poster on which a text image is printed or (b) a display screen on which the text image is displayed (e.g., a display screen and a screen projected by a projector) and (ii) desires to obtain the image which has a higher resolution than the actually captured image.

Note also that it is not always possible for the user to carry out image capture from the front with respect to the image capture object which has a rectangular shape such as (a) paper or a poster on which a text image is printed or (b) a display screen on which the text image is displayed. Namely, the user may obliquely carry out image capture with respect to the image capture object, in a state where (i) a normal direction of a plane of the image capture object on which plane the text image is formed and (ii) a direction in which the portable terminal apparatus 100 carries out the image capture do not coincide with each other. In this case, the image capture object undergoes a distortion (hereinafter referred to as a geometric distortion) in the captured image. The present embodiment is arranged to cause the image output apparatus 200 to output an image, in which such a geometric distortion has been corrected, in a case where the text image capture mode is selected.

The portable terminal apparatus 100, which can communicate with the image output apparatus 200, transmits data of the captured image (hereinafter referred to as captured image data) to the image output apparatus 200.

The image output apparatus 200 carries out a high resolution correction for resolution enhancement with respect to the captured image in accordance with (i) a plurality of pieces of the captured image data on an identical image capture object which are received from the portable terminal apparatus 100 and (ii) motion information of the portable terminal apparatus 100 which information is associated with each of the plurality of pieces of the captured image data. The image output apparatus 200 carries out an output process with respect to the captured image whose resolution has been enhanced. It is possible to employ a method disclosed in the Journal of the Institute of Image Information and Television Engineers Vol. 62, No. 3, pp. 337 through 342 (published in 2008) as a method for carrying out the high resolution correction by use of the plurality of pieces of the captured image data.

Examples of the output process carried out by the image output apparatus 200 include (i) a printing process carried out with respect to an image in accordance with the captured image data whose resolution has been enhanced, (ii) a filing process for causing the captured image data whose resolution has been enhanced to be stored in a storage device such as a server or a USB memory, and (iii) an e-mail transmission process for transmitting an e-mail to which the captured image data whose resolution has been enhanced is attached.

Note that the portable terminal apparatus 100 can be communicated with the image output apparatus 200 as below. The captured image data is transferred from the portable terminal apparatus 100 to the image output apparatus 200 via a wireless communication system which is in conformity with any one of the infrared communication standards such as IrSimple (see a sign A illustrated in FIG. 2). Alternatively, the captured image data is transmitted from the portable terminal apparatus 100 temporarily to an intermediary apparatus 300 via a non-contact wireless communication system such as Felica (registered trademark) (see a sign B illustrated in FIG. 2) and then transferred from the intermediary apparatus 300 to the image output apparatus 200 via a wireless communication system such as Bluetooth (registered trademark). Note that not only the communication systems but also a system employing a publicly-known method is applicable to the communication between the portable terminal apparatus 100 and the image output apparatus 200.

(2) Arrangement of the Portable Terminal Apparatus

First, the portable terminal apparatus 100 of the present embodiment is described below with reference to FIGS. 3 through 11.

FIG. 3 is a block diagram illustrating an arrangement of the portable terminal apparatus 100. The portable terminal apparatus 100 includes a motion detection section 101, an image capture section 102, a captured image determination section 103, an image processing section 104, a communication section (transmission section) 105, a display section 106, an input section 107, a storage medium accessing section 108, a storage section 109, and a control section (an image selecting section, a motion determination section) 110.

The motion detection section 101 detects a motion (positional change) in which the portable terminal apparatus 100 moves in three-dimensional directions. The motion detection section 101, which includes a motion detection sensor (not illustrated), detects a motion velocity and an angular velocity of the portable terminal apparatus 100 which are obtained during the image capture of pieces of the captured image data. Further, the motion detection section 101 supplies, to the control section 110, the detected motion as detected information. Note that the motion detection section 101 can detect an acceleration and an angular acceleration of the portable terminal apparatus 100 as the motion of the portable terminal apparatus 100. In this case, the acceleration and the angular acceleration can be found based on records of their respective directions and levels. Processes carried out by the motion detection section 101 will be specifically described later.

The image capture section 102 carries out image capture with respect to an image capture object by use of a CCD/CMOS sensor. Namely, the image capture section 102 includes a light detecting section in which light detecting elements for receiving light from outside are provided in a planar manner. Then, it is possible to capture images by detecting an amount of light having entered a light detecting surface of the light detecting section. The image capture section 102 carries out the image capture with respect to the image capture object so that a captured image has a predetermined resolution. In a case where the text image capture mode is selected by the user, a single shutter click causes the image capture section 102 to consecutively carry out, more than once (e.g., 2 to 15 times), image capture with respect to the image capture object. Images consecutively captured are generally substantially identical, but will be offset by a minutely small amount due to a camera shake or the like.

While the text image capture mode is being selected, the captured image determination section 103 determines whether or not a plurality of pieces of captured image data captured by the image capture section 102 meet process execution requirements including a requirement for causing the image output apparatus 200 to carry out the high resolution correction. The captured image determination section 103 supplies a determined result to the control section 110. Note that processes carried out by the captured image determination section 103 will be specifically described later.

The image processing section 104 carries out at least an A/D conversion process with respect to the plurality of pieces of captured image data captured by the image capture section 102.

The communication section 105 has functions of serial/parallel transfer and wireless data communication which are in conformity with USB (Universal Serial Bus) 1.1 or USB 2.0 Standard. The communication section 105 transmits, to the image output apparatus 200, (i) the plurality of pieces of captured image data captured by the image capture section 102 and then subjected to the A/D conversion process by the image processing section 104 and (ii) the motion information on the motion (positional change) of the portable terminal apparatus 100 which motion has been detected by the motion detection section 101. Note that according to the present embodiment, the communication section 105 transmits only captured image data and the motion information which are selected by the control section 110, as described later.

The display section 106 is realized by a liquid crystal display device, for example.

The input section 107, which has a plurality of buttons, serves as a section from which the user enters data.

The storage medium accessing section 108 reads out a program for carrying out the processes in the portable terminal apparatus 100 from a storage medium in which the program is recorded.

The storage section 109 serves as a section in which (i) the program for carrying out the processes in the portable terminal apparatus 100, (ii) information on a model of the portable terminal apparatus 100, (iii) user information, and (iv) data required for carrying out the processes are stored. Note that the user information refers to information, for identifying the user of the portable terminal apparatus 100, such as a user ID and a password.

The control section 110 carries out control with respect to the sections of the portable terminal apparatus 100. Specifically, in a case where an instruction to select the text image capture mode is entered from the input section 107, the control section 110 causes the display section 106 to display a window which urges the user to enter, from the input section 107, a magnification of resolution conversion. Subsequently, the control section 110 determines, in accordance with the magnification (e.g., ×2 or ×4) entered from the input section 107, (i) the number of consecutive times of image capture carried out by the image capture section 102 and (ii) a part of the process execution requirements which is used in the captured image determination section 103. In addition to the determination, the control section 110 starts the motion detection section 101. Note that the control section 110 determines the above (i) and (ii) in accordance with information, preliminarily stored in the storage section 109, in which the magnification, the number of times of image capture, and the part of the process execution requirements are associated with each other.

Further, in the case where the instruction to select the text image capture mode is entered from the input section 107, the control section 110 causes the display section 106 to display a window which urges the user to enter, from the input section 107, (i) an instruction to select a kind of the output process (such as the printing process, the filing process, the e-mail transmission process, or the like) and (ii) a setting requirement for carrying out a selected output process (a printing requirement such as the number of sheets to be printed, an address of a server at which data is to be filed, an address of a destination to which an e-mail is transmitted, or the like). Subsequently, the control section 110 receives, from the input section 107, output process information indicative of the kind of the output process and the setting requirement for carrying out the output process.

In addition, the control section 110 selects pieces of the captured image data to be transmitted to the image output apparatus 200 the number of which pieces is in accordance with the magnification entered from the input section 107. Then, the control section 110 assigns, to the selected pieces of the captured image data, (i) file names, (ii) the information on the model of the portable terminal apparatus 100 and the user information which are stored in the storage section 109, and (iii) the output process information, so as to cause the communication section 105 to carry out a process in which the selected pieces of the captured image data to which (i) through (iii) have been assigned are transmitted to the image output apparatus 200. Note that processes carried out by the control section 110 will be specifically described later.

(3) Process Carried out by the Motion Detection Section

Next, the following description specifically discusses processes carried out by the motion detection section 101 of the portable terminal apparatus 100. The motion detection section 101 includes a three-dimensional location sensor and an angular velocity sensor.

Figure 4B:
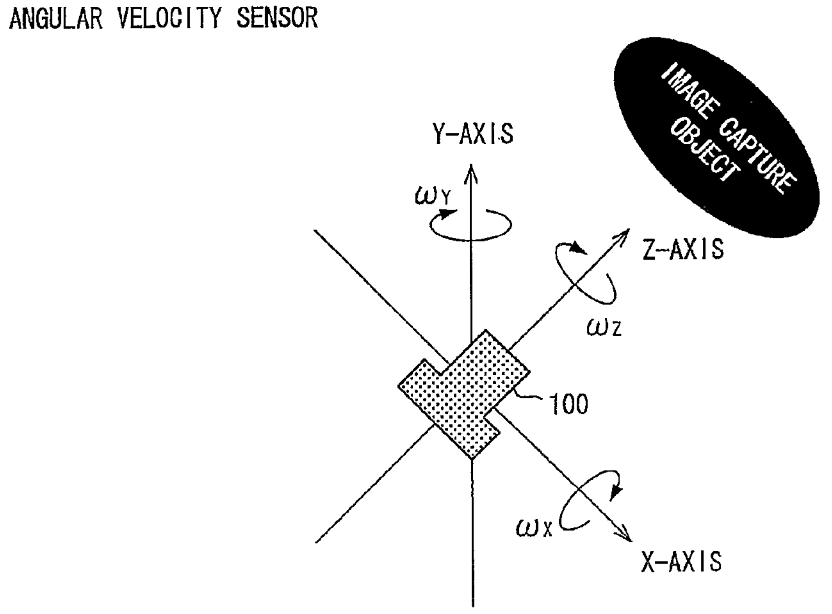

FIG. 4(*a*), which is a schematic view illustrating the motion of the portable terminal apparatus 100, shows the motion detected by the three-dimensional location sensor. FIG. 4(*b*), which is a schematic view illustrating the motion of the portable terminal apparatus 100, shows the motion detected by the angular velocity sensor. The three-dimensional location sensor measures motion velocities $V_X$, $V_Y$, and $V_Z$ at which the portable terminal apparatus 100 moves in directions of an x-axis, a y-axis, and a z-axis, respectively. The x-axis corresponds to a horizontal motion of the portable terminal apparatus 100 to the image capture object, the y-axis corresponds to a vertical motion of the portable terminal apparatus 100 to the image capture object, and the z-axis corresponds to an enlargement reduction change in zoom ratio of the portable terminal apparatus 100 relative to the image capture object (see FIG. 4(*a*)). Namely, the x-axis is parallel to the light detecting surface of the image capture section 102 and extends in a given direction (e.g., a transverse direction of the portable terminal apparatus 100), the y-axis is parallel to the light detecting surface of the image capture section 102 and extends in a vertical direction to the x-axis, and the z-axis extends in a vertical direction to the light detecting surface of the image capture section 102. Accordingly, the three-dimensional location sensor can detect the motion velocities at which the portable terminal apparatus 100 moves to the image capture object in the respective three-dimensional directions.

The motion detection section 101 further includes a calculation section (not illustrated) which finds a traveling (moving) distance of the portable terminal apparatus 100 by use of (i) the motion velocities detected by the three-dimensional location sensor and (ii) measurement times (sequential shooting intervals). The traveling distance is found by integrating the motion velocities $V_X$, $V_Y$, and $V_Z$. For example, the traveling distance from time points $t_0$ to $t_n$ is represented by the following equation (2).

[Math. 2]

$$\text{Traveling distance} = \int_{t0}^{tn} v(t)\,dt \qquad \text{Equation (2)}$$

As described earlier, it is possible to find, by the three-dimensional location sensor, a horizontal traveling distance between pieces of the captured image data by detecting the motion velocity at which the portable terminal apparatus 100 moves in the x-axis direction. Furthermore, it is possible to find a vertical traveling distance between pieces of the captured image data by detecting the motion velocity at which the portable terminal apparatus 100 moves in the y-axis direction. Moreover, it is possible to find a distance displacement between the portable terminal apparatus 100 and the image capture object, i.e., the change in enlargement reduction change in zoom ratio by detecting the motion velocity at which the portable terminal apparatus 100 moves in the z-axis direction. As described earlier, it is possible to find the traveling distances of the portable terminal apparatus 100 on the x-axis, the y-axis, and the z-axis, respectively by causing the three-dimensional location sensor to detect the motion velocities $V_X$, $V_Y$, and $V_Z$ of the portable terminal apparatus 100 on the x-axis, the y-axis, and the z-axis, respectively in a case where the image capture object is fixed.

The angular velocity sensor detects angular velocities ωX, ωY, and ωZ of the portable terminal apparatus 100 on the x-axis, the y-axis, and the z-axis, respectively (see FIG. 4(*b*)).

Figure 5A:
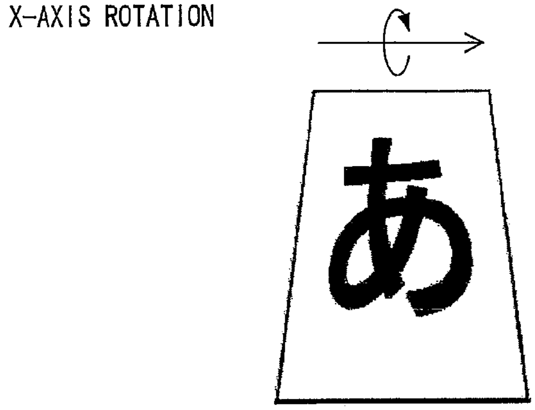
FIG. 5(*a*), which is a schematic view illustrating a geometric change in captured image data relative to three axes illustrated in FIG. 4(*b*), shows a state of the captured image data in which state the x-axis is rotated.
Figure 5B:
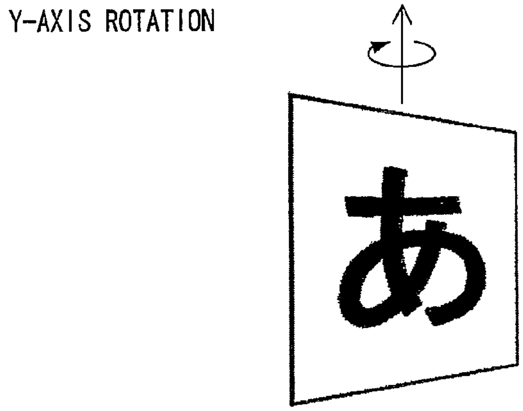
Figure 5C:
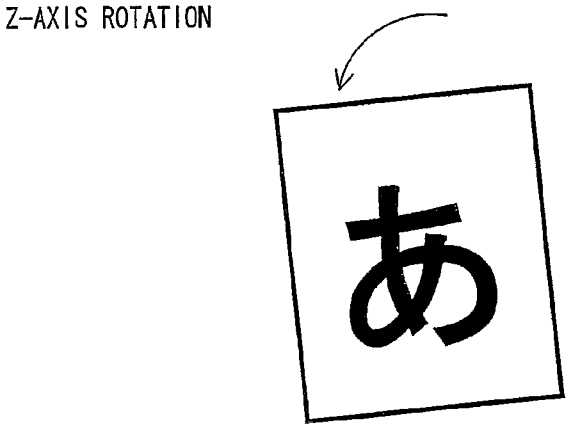
Figure 8:
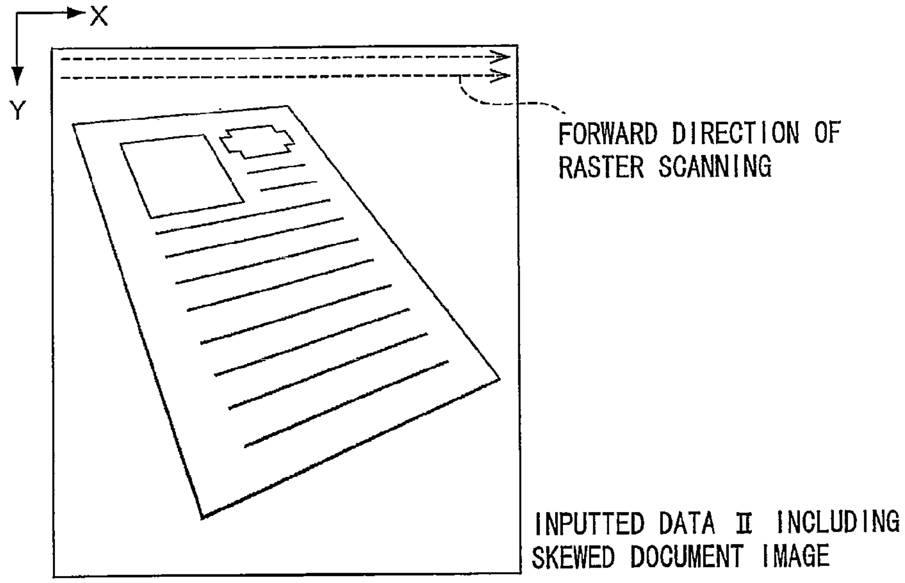
FIG. 8 is a schematic view illustrating an example of detection of a geometric distortion of captured image data which detection is carried out by the captured image determination section illustrated in FIG. 3.
Figure 9:
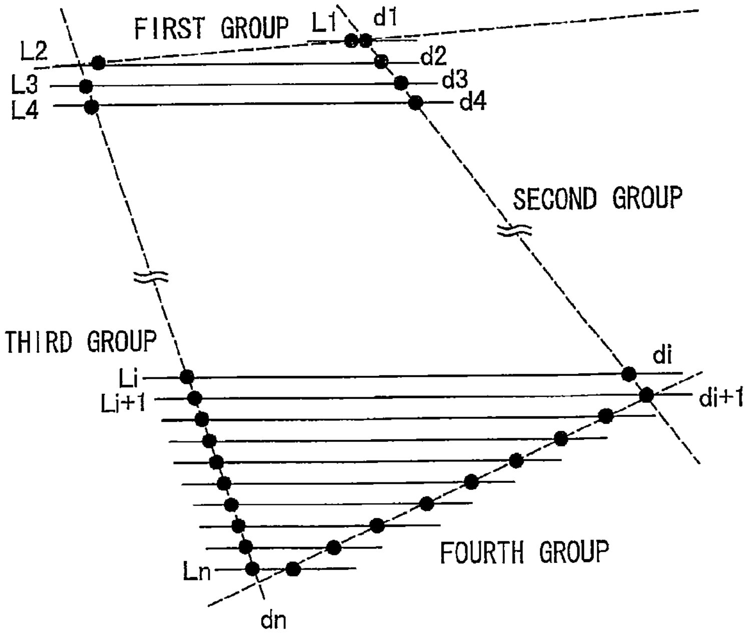
FIG. 9 is a schematic view illustrating an example of an edge detection process which is carried out by the captured image determination section illustrated in FIG. 3 with respect to an image capture object in captured image data.

FIG. 5(*a*) through FIG. 5(*c*) are schematic views illustrating geometric changes in captured image data relative to the respective three axes illustrated in FIG. 4(*b*). FIG. 5(*a*) illustrates a state of the captured image data in which state the x-axis is rotated, FIG. 5(*b*) illustrates a state of the captured image data in which state the y-axis is rotated, and FIG. 5(*c*) illustrates a state of the captured image data in which state the z-axis is rotated. Note here that according to the present embodiment, the angular velocity sensor detects only the angular velocity ωZ in the z-axis direction. This is because the geometric changes caused by ωX and ωY are corrected by a geometric correction (described later) carried out by the image output apparatus 200. For this reason, the angular velocity sensor detects only the angular velocity ωZ of the portable terminal apparatus 100 on the z-axis which angular velocity is subjected to a geometric change as illustrated in FIG. 5(*c*). The calculation section finds a rotation angle of the portable terminal apparatus 100 on the z-axis by use of (i) the angular velocity ωZ supplied from the angular velocity sensor and (ii) the measurement times. The rotation angle is found by integrating the angular velocity ωZ. For example, the rotation angle from the time points $t_0$ to $t_n$ is represented by the following equation (3).

[Math. 3]

$$\text{Rotation angle} = \int_{t0}^{tn} \omega Z(t)\,dt \qquad \text{Equation (3)}$$

As described earlier, it is possible to find a rotation angle formed between a plurality of captured images by causing the angular velocity sensor to detect the angular velocity ωZ.

Note that the time point to refers to a time point at which the image capture section 102 starts carrying out consecutive shooting, i.e., a time point at which a first image is captured and the time point $t_n$ refers to a time point at which an (n−1)th image is captured. This allows the motion detection section 101 to find the traveling distance and the rotation angle from the time point at which the first image is captured.

As described earlier, the portable terminal apparatus 100 provided with the motion detection section 101 can find the traveling distance and the rotation angle of the portable terminal apparatus 100 which are associated with each of the pieces of the captured image data. The motion detection section 101 outputs, as detected information, the motion velocity, the angular velocity, the traveling distance, and the rotation angle of the portable terminal apparatus 100 which are obtained during the image capture.

Note that the present embodiment discusses an arrangement in which the motion velocities $V_X$, $V_Y$, and $V_Z$ in the three-dimensional directions are detected by the three-dimensional location sensor and the angular velocity ωZ is detected by the angular velocity sensor. The traveling distance and the rotation angle can be found by detecting accelerations and an angular acceleration instead of the motion velocities $V_X$, $V_Y$, and $V_Z$ and the angular velocity ωZ, so as to multiply integrate the accelerations and the angular acceleration. Note here that, in a case where the three-dimensional location sensor measures the accelerations $a_X$, $a_Y$, and $a_Z$ instead of the motion velocities $V_X$, $V_Y$, and $V_Z$, it is possible to find the motion velocities $V_X$, $V_Y$, and $V_Z$ by integrating the accelerations $a_X$, $a_Y$, and $a_Z$ by a time axis. In a case where the angular velocity sensor detects the angular acceleration, it is possible to find the angular velocity ωZ by integrating the angular acceleration by the time axis.

Note also that the present embodiment discusses an arrangement in which the motion detection section 101 includes the calculation section. However, an arrangement of the present embodiment is not limited to this. For example, the motion detection section 101 can include no calculation section. Instead, the control section 110 can find various parameters (the motion velocity, the angular velocity, the traveling distance, the rotation angle, etc.). According to this, it is possible to simplify an arrangement of the motion detection section 101, so as to make the portable terminal apparatus 100 smaller and lighter.

(4) Processes Carried Out by the Captured Image Determination Section

The following description discusses how the captured image determination section 103 of the portable terminal apparatus 100 carries out the determination processes.

(4-1) Determination of Skew

As described earlier, the user selects the text image capture mode in a case where the user carries out image capture with respect to the image capture object, which has a rectangular shape, such as paper, a poster, or a display screen and desires to obtain a high resolution image. Therefore, the captured image determination section 103 assumes that the image capture object has a rectangular shape, and detects, in the captured image data, a skew of the image capture object by detecting an edge of the image capture object. Note that a conventionally known method can be employed as a method for detecting, in the captured image data, a pixel located on the edge of the image capture object which has a rectangular shape. In order to prevent a background edge from being erroneously determined to be the edge of the image capture object, it is alternatively possible to employ a method in which it is determined that an edge of the image capture object is detected only in a case where an edge having a length of not less than a given length is detected. In this case, the given length can be set, for example, to a length which is approximately 80% of a length of an end side of an image in the captured image data. Alternatively, it is also possible to cause the user to select the edge of the image capture object from the edges thus detected. It is possible to employ, as such an edge detection method, a technique disclosed in Japanese Patent Application Publication, Tokukai, No. 2006-237757 A.

FIG. 6 is a schematic view illustrating an example of detection of a skew of an image which detection is carried out in a captured image processing method of the present embodiment. The captured image determination section 103 selects two points located on the detected edge of the image capture object of the captured image data including a skewed document image. For example, the captured image determination section 103 selects two points 11 and 12 which are away from a center of the captured image data by w/2 in a transverse direction to the right and left, respectively (see FIG. 6).

Next, a skew of the image capture object in the captured image is determined by determining shortest distances $d_1$ and $d_2$ between an end side of the captured image data and the respective selected two points 11 and 12. In the case of FIG. 6, when an angle of the skew is indicated as θ, $\tan\theta=(d_2-d_1)/w$. Then, the captured image determination section 103 calculates a value of $(d_2-d_1)/w$ and reads out a corresponding angle of the skew θ, for example, from a table (refer to FIG. 7) which has been prepared in advance.

Subsequently, the captured image determination section 103 determines whether or not the detected angle of the skew θ falls within a given range (e.g., not less than −30° and not more than)+30° and supplies a determined result to the control section 110. Note here that it is one of the process execution requirements that the angle of the skew θ falls within the given range.

(4-2) Determination of Geometric Distortion

As described earlier, the geometric distortion means that in a case where image capture is obliquely carried out with respect to the image capture object from a direction different from the normal direction of the plane of the image capture object on which plane the text image is formed, the image capture object has, in the captured image, a distorted shape instead of the rectangular shape. For example, in a case where image capture is carried out with respect to the image capture object obliquely, i.e., from a left below direction with respect to a normal direction of the paper, the image capture object has a distorted quadrangular shape (see FIG. 8).

As described later, according to the present embodiment, the image output apparatus 200 has a function of correcting such a geometric distortion. Note, however, that in a case where the geometric distortion occurs to a large degree, readability will not be so enhanced even if the geometric distortion is corrected. In view of this, the captured image determination section 103 of the present embodiment detects features indicative of a degree of the geometric distortion so as to determine whether or not the features fall within a given range.

Edges of respective sides of the image capture object do not necessarily exist in the vicinity of a center of the angle of view. In view of this, according to the present embodiment, edges are extracted, at given regular intervals, from all sides, line segments identified by the respective edges are found, and intersections of these line segments are found, thereby defining a region where the image capture object is located.

First, the captured image determination section 103 carries out a raster scanning with respect to the captured image data. Note here that (i) a forward direction of the raster scanning and (ii) a direction which is perpendicular to the forward direction are an X direction and a Y direction, respectively (see FIG. 8). Note also that an upper left corner is an origin in the captured image data.

In a case where no edge is detected as a result of the scanning carried out with respect to one (1) line, the captured image determination section 103 carries out the scanning with respect to a subsequent line which is away from the one line by a predetermined distance in the Y direction. Note that an interval between the lines is not limited to a specific one, provided that it is a fixed one. Further, the line is not necessarily constituted by a single pixel.

Next, in the raster scanning, the captured image determination section 103 regards, as $L_1$ (a first line), a line on which an edge is firstly detected. The captured image determination section 103 classifies, into a first group, coordinates of a point determined to be the first edge in the forward direction, and then classifies, into a second group, coordinates of a point determined to be the second edge on the first line (see FIG. 9). The scanning is consecutively carried out with respect to a subsequent line so that an edge is detected. Then, with respect to each line $L_i$, a difference in X-coordinate value between (a) a point firstly determined to be an edge of the image capture object in the forward direction and (b) a point secondly determined to be an edge of the image capture object in the forward direction (a distance $d_i$ between X-coordinates of the two points) is found, and then an edge determination is carried out as below.

It is assumed that the X-coordinate of the first edge on the line $L_i$ is $X_{i1}$ (the X-coordinate belonging to the first group) and the X-coordinate of the second edge on the line $L_i$ is $X_{i2}$ (the X-coordinate belonging to the second group). The features detection method is carried out as below.

(a) Coordinates $X_{11}$ and $X_{12}$ on the first line ($L_1$) are invariable.

(b) As for an ith line (i is an integer of not less than 2), an intercoordinate distance $d_{i1}$ ($=X_{i1}-X_{(i-1)\ 1}$) and $d_{i2}$ ($=X_{i2}-X_{(i-1)\ 2}$) are found. Note that the following description discusses $d_{i1}$, and so omits a suffix 1. Same applies to $d_{i2}$.

(c) As for an ith line (i is an integer of not less than 3), $dd_i=abs\{(d_i)-d_{i-1}\}$ is found. In a case where $dd_i \leqq th_1$ (, a small value close to 0 (zero)), a coordinate $X_i$ is classified into an identical group (the first group or the second group). Otherwise (in a case where $dd_i > th_1$), the coordinate $X_1$ is classified into a different group (a third group or a fourth group).

(d) Only in a case where i=4, a process for deciding a group of $X_2$ is carried out as an initial process. The process is carried out as below.

i) $dd_3 \leqq th_1$ and $dd_4 \leqq th_1 \rightarrow X_2$: identical group
ii) $dd_3 > th_1$ and $dd_4 \leqq th_1 \rightarrow X_2$: different group
iii) $dd_3 \leqq th_1$ and $dd_4 > th_1 \rightarrow X_2$: identical group
iv) $dd_3 > th_1$ and $dd_4 > th_1 \rightarrow X_2$: identical group Once a transition of $X_2$ to the different group (the third group or the fourth group) occurs, it is unnecessary to check increase and decrease in $dd_i$.

Such a process is carried out with respect to an entire image so that edge points are extracted for each of the groups. Then, coordinates of the edge points which belong to each of the groups are subjected to linearization by use of a method such as a method of least squares or the like. This allows a straight line, which is approximate to the edge points which belong to each of the groups, to be found. The lines correspond to the sides of the image capture object.

Figure 10:
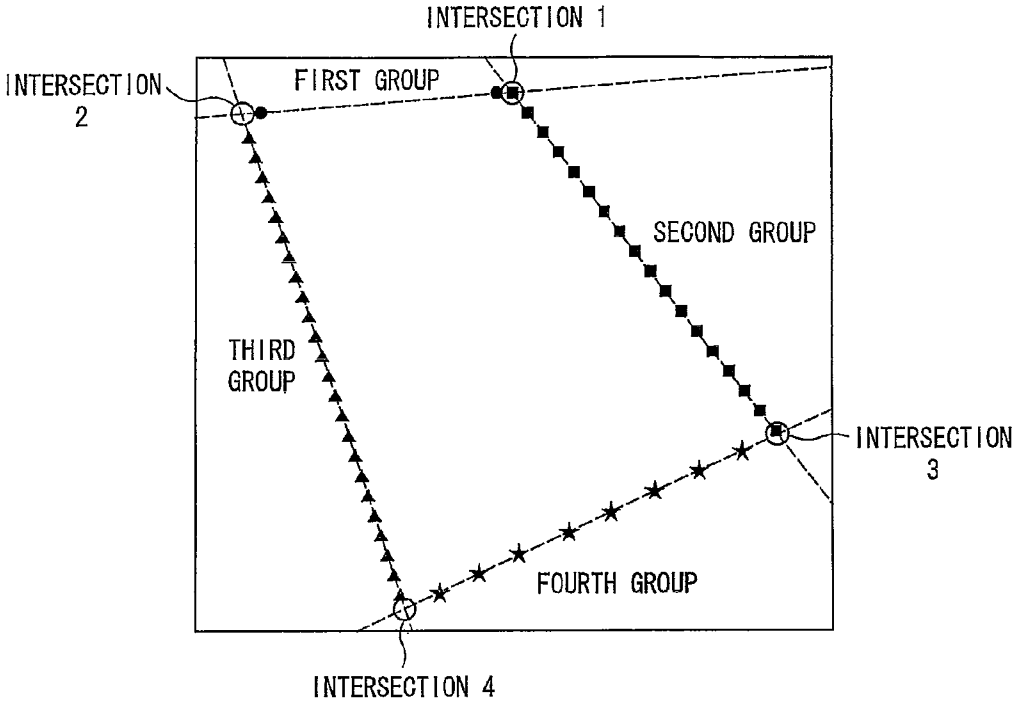
FIG. 10 is a schematic view illustrating an example of detection of an edge of captured image data in a raster direction which detection is carried out by the captured image determination section illustrated in FIG. 3.

FIG. 10 is a schematic view illustrating a case where edge points are extracted by the raster scanning in accordance with a process as mentioned above and classified into the four groups. Note, in FIG. 10, that a circle indicates an edge which belongs to the first group, a quadrangle indicates an edge which belongs to the second group, a triangle indicates an edge which belongs to the third group, and a star indicates an edge which belongs to the fourth group. Note also in FIG. 10 that straight lines, which have been subjected to the linearization by use of the method of least squares so as to be approximate to the edge points for each of the groups, are illustrated by respective dotted lines.

Then, intersections (intersections 1 through 4 illustrated in FIG. 10) of the straight lines for the respective four groups are found. This makes it possible to define a region surrounded by the four straight lines as a region where the image capture object is located.

Further, a classifying process as mentioned above can be carried out with respect to captured image data which has been subjected to a 90-degree rotation. This also allows an extraction of edges of a document which is ideally provided so as to be parallel to a horizontal direction and a vertical direction of the captured image data. Namely, the raster scanning allows a detection of an edge in the vertical direction in the captured image data which has not been rotated. In contrast, the raster scanning allows a detection of an edge which was in the horizontal direction before the captured image data was rotated (which is in the vertical direction after the captured image data is rotated) in the captured image data which has been rotated. This also allows an extraction of edges which are parallel to the vertical direction and the horizontal direction. As long as a sufficient amount of information is obtained (for example, not less than three intersections are obtained in each of the groups) before the rotation of the captured image data, only this information can be used. In contrast, in a case where the number of intersections obtained is less than one in any one of the groups, it is obviously impossible to formulate a straight line. In such a case, intersections obtained after the rotation of the captured image data can be used.

Alternatively, it is also possible to formulate a straight line by (i) carrying out again a coordinate conversion with respect only to found coordinates of an intersection, (ii) finding a corresponding group from regions in which the respective groups are distributed, and (iii) integrating information on the intersections. Namely, the straight line can be formulated by integrating coordinates of intersections, which belong to an identical group, out of (i) coordinates of intersections which coordinates are found by the captured image data which has not been rotated and (ii) coordinates of intersections which coordinates are obtained by carrying out a coordinate conversion with respect to intersections found by the captured image data which has been rotated.

Note that it is possible to extract an edge point in accordance with the following method. Pixel values, obtained in a small window which has a width of at least one pixel, are compared as they are (a sum or an averages of the pixel values are compared in a case where the width is not less than two pixels). In a case where pixel values of adjacent windows have a difference of not less than a given value, an edge point can be determined. In order to prevent a background edge or an edge of a text included in the image capture object from being erroneously determined to be the edge of the image capture object, it is alternatively possible to employ a method in which it is determined that an edge of the image capture object is detected only in a case where an edge having a length of not less than a given length is detected. In this case, the given length can be set, for example, to a length which is approximately 80% of a length of an end side of an image in the captured image data. Alternatively, it is also possible to cause the user to select the edge of the image capture object from the edges thus detected. It is possible to employ, as such an edge detection method, a technique disclosed in Japanese Patent Application Publication, Tokukai, No. 2006-237757 A. Alternatively, it is also possible to prevent such an erroneous detection by carrying out an evaluation of each of the coordinate groups or a process for detecting a line segment (e.g., a Hough transformation). Further, it is possible to prevent an edge of a text or a fine texture from being erroneously detected by carrying out a process employing a reduced image as preprocessing.

After finding the four straight lines and their intersections, the captured image determination section 103 finds each ratio between lengths of opposite sides of the quadrangle defined by the four straight lines. The each ratio between the lengths can be easily found by use of the coordinates of the intersections. Note that the quadrangle has two pairs of the opposite sides and thus the captured image determination section 103 finds a ratio between lengths for each of the two pairs.

Note here that the ratio between the lengths of the opposite sides is equal to 1 (one to one) in a case where image capture is carried out, from the front, with respect to the image capture object which has a rectangular shape, the image capture object included in the captured image also has a rectangular shape. In contrast, in a case where image capture is obliquely carried out with respect to the image capture object which has a rectangular shape, the ratio becomes a value different from 1. This is because the image capture object included in the captured image data has a distorted quadrangular shape. As a direction in which image capture is carried out is at a greater angle to the normal direction of the plane of the image capture object on which plane the text image is formed, a difference between a value of the ratio and 1 increases. It follows that the ratio between the lengths of the opposite sides is one of the features indicative of a degree of the geometric distortion.

Then, the captured image determination section 103 determines whether or not each of the two ratios that has been found falls within a given range (e.g., not less than 0.5 and not more than 2) and supplies a determined result to the control section 110. Note here that the given range is set in advance so that a geometric distortion correction can be made by the image output apparatus 200, and is stored in the storage section 109. Note also that it is one of the process execution requirements that each of the two ratios falls within the given range (e.g., not less than and not more than 2).

Note that the captured image determination section 103 can use, as alternative features indicative of the degree of the geometric distortion, an angle formed by two straight lines which are defined by two and the remaining two, respectively, of the four intersections which have been detected as above.

(4-3) Determination of Brightness

As for a brightness, for example, in a case where overexposure occurs (the captured image is too bright) or underexposure occurs (the captured image is too dark), image capture may be required to be carried out again. In view of this, the captured image determination section 103 finds, for example, maximum and minimum ones of pixel values obtained in the captured image data. In a case where the maximum value is not more than a given threshold (e.g., 100 in case of 8 bits), the captured image determination section 103 determines that underexposure occurs, and then supplies, to the control section 110, a determined result. In contrast, in a case where the minimum value is not less than a given threshold (e.g., 150 in case of 8 bits), the captured image determination section 103 determines that overexposure occurs, and then supplies, to the control section 110, a determined result. Alternatively, the control section 110 changes the setting of the image capture section 102 so that the image capture section 102 has longer exposure time in the case of underexposure. In contrast, the control section 110 changes the setting of the image capture section 102 so that the image capture section 102 has shorter exposure time in the case of overexposure.

(4-4) Determination of Contrast

As for a contrast, in a case where a difference between the maximum and minimum values of the pixel values obtained in the captured image data is not more than a given threshold, the captured image determination section 103 determines that the captured image has a poor contrast.

Note that the captured image determination section 103 can carry out the determination of a brightness and a contrast with respect to each of color channels or can use an average value (R+G+B/3) or a brightness value ($0.299\times R+0.587\times G+0.114\times B$: conforming to NTSC).

(4-5) Determination of Color Balance

As for a color balance, it is possible to detect an occurrence of an excessive imbalance in a given color channel by comparing average values of or maximum/minimum values of the respective color channels (R, G, and B). In view of this, the captured image determination section 103 determines that the captured image has a poor color balance, for example, in a case where (i) average values (Ra, Ga, and Ba) of the pixel values of the respective color channels which pixel values are obtained in the captured image data and have values in the vicinity of a maximum brightness value (in a range of maximum brightness to (maximum brightness−5)) are found, and (ii) a difference between the maximum value and the minimum value of average values (Ra, Ga, and Ba) of the respective color channels is not less than a corresponding given value [Max (Ra, Ga, and Ba)−Min (Ra, Ga, and Ba)>0.1× Max (Ra, Ga, and Ba)].

(5) Processes Carried Out by the Control Section

Next, the following description specifically discusses processes carried out by the control section 110 of the portable terminal apparatus 100.

(5-1) Selection of Captured Image Data

In accordance with the detected information (the motion velocity, the angular velocity, the traveling distance, the rotation angle, etc.) supplied from the motion detection section 101, the control section 110 selects a given number of pieces of the captured image data which are suitably used for a positioning process (described later). The control section 110 preferentially selects, in accordance with the detected information, the given number of pieces of the captured image data in order from a piece of the captured image data which piece has been captured at a low total velocity $V_t$ of the motion velocities VX, VY, and VZ and the angular velocity ωZ.

For example, a total velocity $V_t$ can be found based on the following equation (4).

[Math. 4]

$$V_t=\alpha\times\omega Z+\sqrt{V_X^2+V_Y^2+V_Z^2} \quad \text{Equation (4)}$$

In the equation (4), a denotes a given weighting factor. A ratio of influence is set to α in accordance with influence, on an image blur, of the motion velocity and the rotation velocity which are experimentally obtained.

The following description specifically illustrates a selection by the control section 110 of the given number of pieces of the captured image data. A case in which the control section 110 selects 4 out of 8 pieces of the captured image data by use of the detected information supplied from the motion detection section 101 is to be described here. Note that for convenience, the z-axis is omitted and the description is to be given in accordance with a relationship between (i) the motion velocities on the x-axis and the y-axis and (ii) a image capture time.

Figure 11:
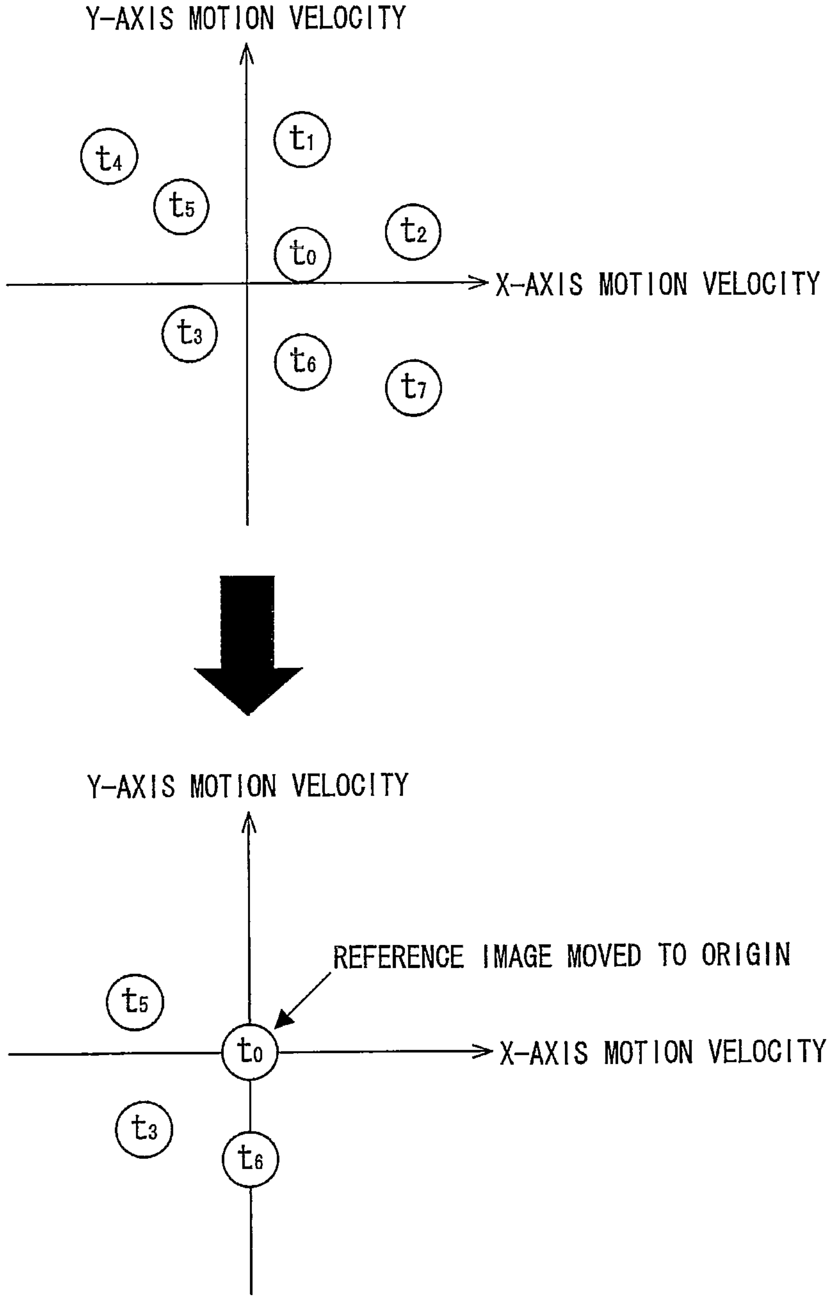
FIG. 11 is a schematic view illustrating an example of a selection of captured image data which selection is carried out by the control section illustrated in FIG. 3.

FIG. 11 is a schematic view illustrating an example of the selection by the control section 110 of the given number of pieces of the captured image data. $t_0$ through $t_7$ of FIG. 11 represent time points at which 8 pieces of the captured image data supplied from the image capture section 102 to the control section 110 are captured. The x-axis and the y-axis of FIG. 11 represent the motion velocities at which the portable terminal apparatus 100 moves in the x-axis direction in the y-axis direction, respectively during the time points $t_0$ to $t_7$. A piece of the captured image data at the time point to is the closest to an intersection of the x-axis and the y-axis, and this piece seems to have been captured at the lowest total velocity $V_t$ (see FIG. 11). For this reason, the control section 110 selects the piece of the captured image data at the time point $t_0$ as a reference image. Subsequently, the control section 110 selects pieces of the captured image data at the time points $t_3$, $t_5$, and $t_6$ which pieces have been captured at the total velocities $V_t$ which are the second lowest to the total velocity $V_t$ at the time point $t_0$. As described earlier, in order from the piece of the captured image data which piece has been captured at the low total velocity $V_t$, the control section 110 preferentially selects the given number of pieces of the captured image data, so as to use, for the positioning process, the given number of pieces of the captured image data in which fewer images are offset. This realizes higher accuracy of the super resolution process.

The control section 110 finds traveling distances of the respective selected pieces of the captured image data from the reference image. For example, a traveling distance in the x-axis direction (hereinafter referred to as an x-axis direction traveling distance) from the reference image of the piece of the captured image data at the time point $t_3$ is represented by the following equation (5).

[Math. 5]

$$\begin{aligned}X\text{-axis direction traveling distance} &= \int_{t0}^{t3}(V_X(t)-V_X(t_0))\,dt = \\ &(V_X(t_1)-V_X(t_0))\times(t_1-t_0)+(V_X(t_2)-V_X(t_1))\times \\ &(t_2-t_1)+(V_X(t_3)-V_X(t_2))\times(t_3-t_2)\end{aligned} \quad \text{Equation (5)}$$

Similarly, the control section 110 finds traveling distances in the y-axis direction and the z-axis direction, respectively from the reference image. The control section 110 supplies, to the communication section 105, the selected pieces of the captured image data and the motion information including the traveling distances of the respective selected pieces of the captured image data from the reference image. Then, the communication section 105 transmits the selected pieces of the captured image data and the motion information to the image output apparatus 200.

Note that the given number of pieces of the captured image data selected by the control section 110 depends on the magnification of the resolution conversion. For example, 4 pieces of the captured image data are selected in a case where the resolution conversion is carried out at a magnification of ×4, and 2 pieces of the captured image data are selected in a case where the resolution conversion is carried out at a magnification of ×2.

(5-2) Notification to User

In response to the detected information supplied from the motion detection section 101, the control section 110 can control the display section 106 to display a message urging image capture to be carried out again.

For example, since a higher motion velocity causes a larger image blur, it is preferable to obtain a required number of pieces of the captured image data which pieces have been captured at lower motion velocities than a given threshold. For this reason, the control section 110 determines, in accordance with the motion information, whether or not a required number of pieces of the captured image data which pieces have been captured at lower total velocities $V_t$ than a given threshold. In a case where it is impossible to obtain the required number of pieces of the captured image data which pieces have been captured at the lower total velocities $V_t$ than the given threshold, the control section 110 controls the display section 106 to display a message urging image capture to be carried out again. Note that the threshold used for the determination can be experimentally found based on the motion velocity of the portable terminal apparatus 100 and a degree of a blur of a corresponding piece of the captured image data.

In response to the determined result received from the captured image determination section 103, the control section 110 controls the display section 106 to display a message urging image capture to be carried out again.

For example, when receiving, from the captured image determination section 103, a determined result that an angle of the skew θ falls outside the given range, the control section 110 controls the display section 106 to display a message which urges image capture to be carried out again so that the image capture object is not skewed.

In response to a determined result that features indicative of a degree of the geometric distortion (here, a ratio between the lengths of the opposite sides of the image capture object in the captured image) falls outside the given range, the control section 110 controls the display section 106 to display a message which urges image capture to be carried out again from the normal direction of the plane of the image capture object on which plane the text image is formed.

(6) Arrangement of the Image Output Apparatus

An arrangement of the image output apparatus 200 is described below with reference to FIGS. 12 through 20. In the present embodiment, the image output apparatus 200 is a multifunction printer which has a plurality of functions such as a fax machine, a copying machine, a printer, and a scanner.

Figure 12:
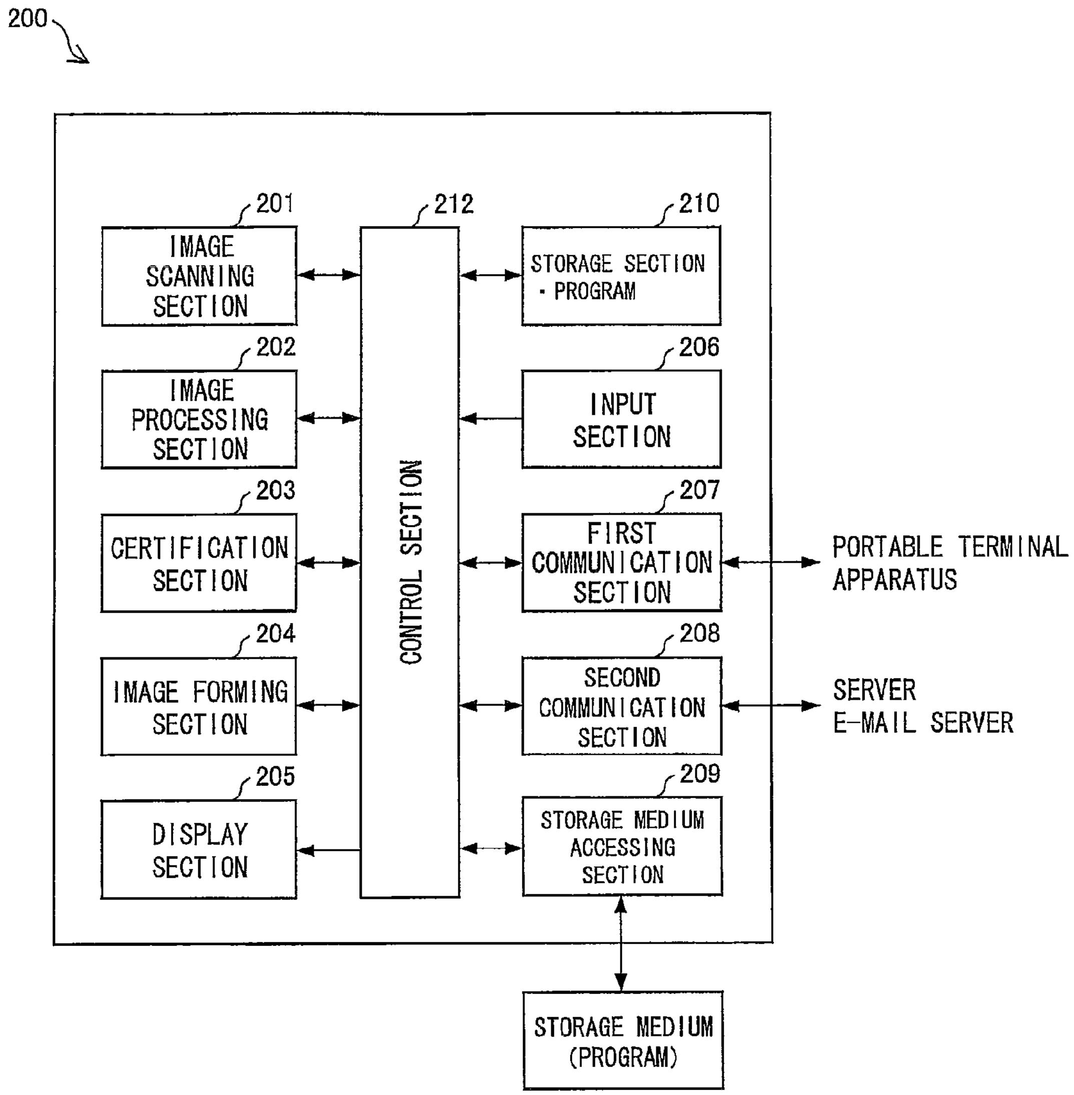
FIG. 12 is a block diagram illustrating an arrangement of the image output apparatus illustrated in FIG. 2.
Figure 13:
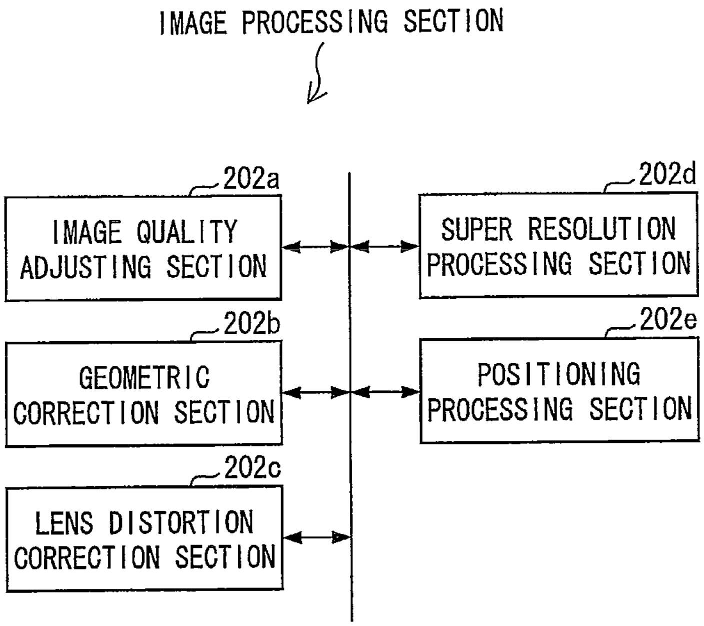
FIG. 13 is a block diagram illustrating an arrangement of the image processing section illustrated in FIG. 12.

FIG. 12 is a block diagram illustrating the arrangement of the image output apparatus 200. FIG. 13 is a block diagram illustrating an arrangement of an image processing section 202. The image output apparatus 200 includes an image scanning section 201, the image processing section 202, a certifying section 203, an image forming section (output section) 204, a display section 205, an input section 206, a first communication section (receiving section) 207, a second communication section (an output section) 208, a storage medium accessing section 209, a storage section 210, and a control section (an output section) 212 (see FIG. 12).

The image scanning section 201 scans a document and has a scanner section including a CCD (Charge Coupled Device) which converts light reflected from the document to an electric signal (an analogue image signal) which has been subjected to R, G, and B color separations. Then, the image scanning section 201 supplies this electric signal.

The image processing section 202 carries out given image processing with respect to image data. According to the present embodiment, the image processing section 202 carries out various image processing tasks with respect to the captured image data transmitted from the portable terminal apparatus 100. Specifically, the image processing section 202 carries out the positioning process, a super resolution correction, a color balance correction, a contrast correction, a brightness correction, a lens distortion correction, the geometric correction, etc. For this reason, the image processing section 202 includes a positioning processing section 202*e* for carrying out the positioning process, a super resolution processing section 202*d* for carrying out the super resolution correction, an image quality adjusting section 202*a* for carrying out the color balance correction, the contrast correction, and the brightness correction, a lens distortion correction section 202*c* for carrying out the lens distortion correction, and a geometric correction section 202*b* for carrying out the geometric correction. The image processing carried out by the image processing section 202 with respect to the captured image data will be specifically described later.

The certifying section 203 carries out user certification when the output process is carried out with respect to the captured image data received from the portable terminal apparatus 100. Specifically, the certifying section 203 carries out the user certification by comparing (a) the user information received from the portable terminal apparatus 100 with (b) the user information entered from the input section 206 (a user ID and a password). The certifying section 203 transmits a certified result to the control section 212.

The image forming section 204 forms an image on recording paper such as paper by use of an electrophotographic printing method, an ink-jet method, or the like. Namely, the image forming section 204 carries out the printing process which is one of the output processes.

The display section 205 is realized by a liquid crystal display device, for example. The input section 206 is provided for entering data by, for example, touching a touch panel or a button included in the liquid crystal display device.

The first communication section 207 has functions of the serial/parallel transfer and the wireless data communication which are carried out in conformity with the USB 1.1 or USB 2.0 Standard. The first communication section 207 receives, from the portable terminal apparatus 100, (i) the captured image data to which the file name, the information on the model of the portable terminal apparatus 100, the user information, and the output process information are added and (ii) the motion information.

The second communication section 208 has the following functions (a) through (c): (a) data communication employing a wireless technology which is in conformity with any one of LAN standards IEEE 802.11a, IEEE 802.11b, and IEEE 802.11g, (b) data communication with a network, via a LAN cable, having a communications interface function employing Ethernet (registered trademark), and (c) data communication employing a wireless technology which is in conformity with any one of communication systems such as IEEE 802.15.1 (so-called Bluetooth (registered trademark) which is the wireless communication standard, the infrared communication standard such as IrSimple, and Felica (registered trademark).

The second communication section 208 carries out, as the output process, (i) the filing process for causing the captured image data which has been subjected to the super resolution correction etc. to be stored in the server or (ii) the e-mail transmission process for transmitting the e-mail to which the captured image data which has been subjected to the super resolution correction etc. is attached.

The storage medium accessing section 209 reads out a program from a storage medium in which the program is recorded. The storage section 210 serves as a section in which a program for causing the sections of the image output apparatus 200 to carry out their respective processes is stored.

The control section 212 carries out control with respect to the sections included in the image output apparatus 200. Specifically, when the first communication section 207 receives the plurality of pieces of captured image data from the portable terminal apparatus 100, the control section 212 supplies the plurality of pieces of captured image data to the image processing section 202 so as to control the image processing section 202 to carry out the image processing. In addition, the control section 212 supplies, to the certifying section 203, the user information added to the captured image data so as to control the certifying section 203 to carry out a certification process. When receiving a certified result that the certification has been successfully carried out, the control section 212 controls the corresponding process to be carried out in accordance with the output process information added to the captured image data. Namely, in a case where the output process information is indicative of the printing process, the control section 212 controls the image forming section 204 to carry out the printing in accordance with the captured image data which has been subjected to the image processing by the image processing section 202. Alternatively, in a case where the output process information is indicative of the filing process or the e-mail transmission process, the control section 212 controls the second communication section 208 to carry out the filing process or the e-mail transmission process in accordance with the captured image data which has been subjected to the image processing by the image processing section 202.

(7) Image Processing Carried Out by the Image Processing Section

The image processing carried out by the image processing section 202 is specifically described below. Note that the description below discusses details of the image processing carried out with respect to the plurality of pieces of captured image data received from the portable terminal apparatus 100, though the image processing section 202 also carries out the image processing with respect to the image data scanned by the image scanning section 201.

(7-1) Positioning Process

The image processing section 202 causes the positioning processing section 202e to estimate an affine transformation coefficient in accordance with the plurality of pieces of the captured image data and the motion information which have been transmitted from the communication section 105, so as to carry out a positioning process. Note that an intentional motion of a photographer or a vibration generated by the portable terminal apparatus 100 itself can cause an offset during the image capture.

Assuming that an x-axis direction traveling distance, a y-axis direction traveling distance, and a z-axis direction traveling distance from the reference image are Mx, My, and Mz, respectively and a rotation angle on the z-axis is θ, an affine transformation coefficient for correcting an offset is estimated based on the following equation (6).

[Math. 6]

$$\begin{pmatrix} x' \\ y' \\ 1 \end{pmatrix} = \begin{pmatrix} f(Mz) & 0 & 0 \\ 0 & f(Mz) & 0 \\ 0 & 0 & 1 \end{pmatrix} \begin{pmatrix} \cos\theta & \sin\theta & 0 \\ -\sin\theta & \cos\theta & 0 \\ 0 & 0 & 1 \end{pmatrix} \begin{pmatrix} 1 & 0 & g(Mx) \\ 0 & 1 & g(My) \\ 0 & 0 & 1 \end{pmatrix} \begin{pmatrix} x \\ y \\ 1 \end{pmatrix} \qquad \text{Equation (6)}$$

In the equation (6), x and y represent coordinates which have not been subjected to affine transformation, and x' and y' represent coordinates which have been subjected to affine transformation. Note that f represents a function of the z-axis direction traveling distance Mz which function shows an increase/a decrease magnification and g represents a function of the x-axis direction traveling distance Mx or the y-axis direction traveling distance My which function shows a traveling distance.

Of the affine transformation matrices in the equation (6), the affine transformation matrix on the left, which corresponds to a scale variance, can estimate the z-axis direction traveling distance in accordance with Mz, the affine transformation matrix at the center, which corresponds to a rotation, can estimate the rotation angle in accordance with θ, and the affine transformation matrix on the right, which corresponds to a parallel displacement, can estimate the x-axis direction traveling distance and the y-axis direction traveling distance in accordance with Mx and My, respectively.

FIG. 14 has schematic views each illustrating a relationship between a focal length and an object distance of the portable terminal apparatus 100. (a) of FIG. 14 illustrates the relationship between the focal length and the object distance which are obtained during capture of the reference image, and (b) of FIG. 14 illustrates the relationship between the focal length and the object distance which are obtained after the portable terminal apparatus 100 has moved the distance Mz toward the image capture object (in the z-axis direction). Assume that the portable terminal apparatus 100 has moved the distance Mz toward the image capture object (in the z-axis direction) in a case where during the capture of the reference image, a distance from a light detecting surface of a CCD to a lens center is a focal length F and a distance from the lens center to the image capture object is an object distance L. In this case, the object distance changes from L to (L−Mz) since the focal length F is fixed. A function f can be defined by the following equation (7) by use of the focal length and the object distance which are in such a relationship.

[Math. 7]

$$f(Mz) = \frac{\frac{F}{L-Mz}}{\frac{F}{L}} = \frac{L}{L-Mz} \qquad \text{Equation (7)}$$

In the equation (7), L represents the object distance. The object distance, which is measured during an autofocus process by use of time points between infrared or ultrasonic irradiation and return of a reflected wave, is associated with the captured image data, so as to be transmitted from the portable terminal apparatus 100 as the motion information.

Figure 15:
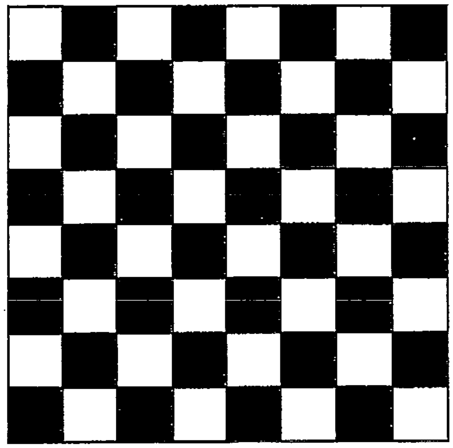
FIG. 15 is a schematic view illustrating a lattice pattern for finding a focal length used in a positioning process of the present embodiment.

In contrast, for a portable terminal apparatus 100 which does not have the above function, it is possible to use an object distance which has been experimentally found in advance in accordance with an optical magnification and a focal length (a location of a lens) of the image capture section 102 (a table showing a relationship between (i) an output value for the location where the lens is focused and (ii) the object distance). For example, it is possible to estimate the object distance in accordance with the focal length defined by the autofocus process by fixing the optical magnification and the object distance and finding the focal length (a focusing requirement) where the highest contrast is obtained during capture of an image of a lattice pattern as illustrated in FIG. 15, so as to find in advance a relationship between the object distance and the focal length which are obtained when the highest contrast is obtained.

Note that it is unnecessary to specify F in the equation (7) since F, which is a value characteristic of the portable terminal apparatus 100, is finally offset by a numerator and a denominator. Note also that according to the present embodiment, the motion information includes the z-axis direction motion of the portable terminal apparatus 100. However, in order to cause the z-axis direction motion of the portable terminal apparatus 100 not to include the motion information, f (Mz) can be set to 1.

Figure 16:
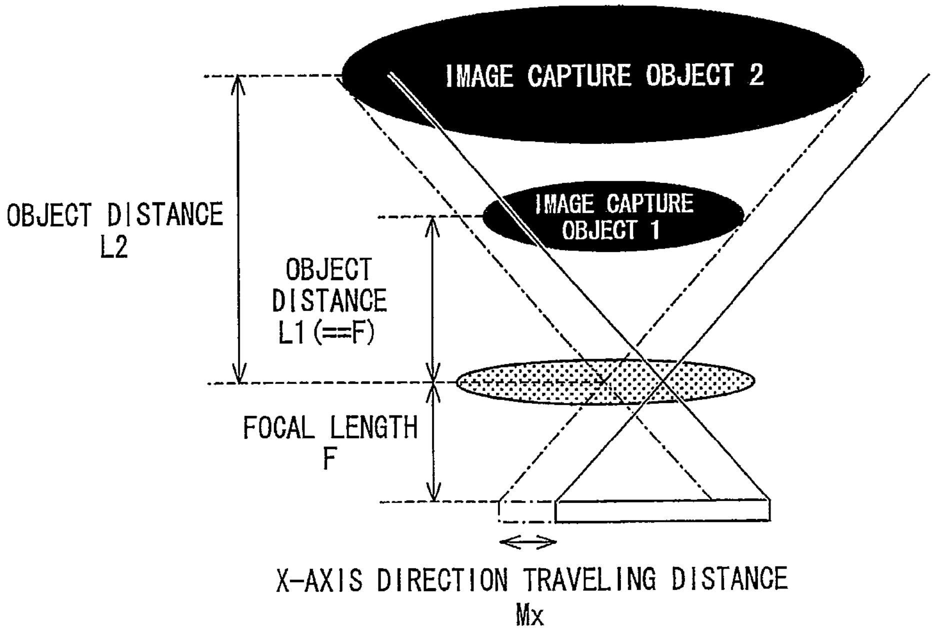
FIG. 16 is a schematic view illustrating the relationship between the focal length and the object distance which are obtained after the portable terminal apparatus has moved in the x-axis direction.

FIG. 16 is a schematic view illustrating the relationship between the focal length and the object distance which are obtained after the portable terminal apparatus 100 has moved in the x-axis direction. A function g can be defined by the following equation (8) by preparing in advance a given coefficient β defining a relationship between the traveling distance and the number of moved pixels of a corresponding piece of the captured image data.

[Math. 8]

$$g(Mx) = \beta \times Mx \qquad \text{Equation (8)}$$

β, which is a value characteristic of the portable terminal apparatus 100 in the equation (8), is set in accordance with a pixel count of the portable terminal apparatus 100 (β for each pixel count is preset). Note that g (Mx) is set to 0 (zero) when no x-axis direction motion is detected and g (My) is set to 0 (zero) when no y-axis direction motion is detected. Note also that the rotation angle θ is set to 0 (zero) when no angular velocity ωZ on the z-axis is detected.

According to the above processes, it is possible to carry out the positioning process by finding the affine transformation coefficient for correcting the offset in accordance with the plurality of pieces of the captured image data and the motion information which have been transmitted from the portable terminal apparatus 100.

(7-2) Color Balance Correction, Contrast Correction, and Brightness Correction

The image processing section 202 causes the image quality adjusting section 202*a* to carry out the color balance correction, the contrast correction, and the brightness correction.

A color balance can be corrected in accordance with a method in which the image processing section 202 finds maximum and minimum values of the received captured image data for each of the color channels, prepares look-up tables which cause the color channels to have uniform maximum and minimum values, and apply the look-up tables to the respective color channels. FIG. 17 shows an example of the look-up tables. As shown in FIG. 17, in a case where (i) a given channel has a maximum value of MX and a minimum value of MN and (ii) the data has 8 bits, a look-up table can be prepared that causes an increase from MN in increments of (MX−MN)/255.

The image quality adjusting section 202*a* carries out the contrast correction and the brightness correction in a similar manner to the color balance correction. Note that the look-up tables applied to the respective color channels can be identical in a case where it is unnecessary to change a color balance to a specific one. Note that an alternative publicly-known technique can be applied to the color balance, contrast, and brightness corrections.

(7-3) Lens Distortion Correction and Geometric Distortion Correction

The image processing section 202 causes the lens distortion correction section 202*c* to carry out the lens distortion correction and causes the geometric correction section 202*b* to carry out the geometric correction.

Like the captured image determination section 103, the image processing section 202 sequentially detects, by the raster scanning, points on an edge of the image capture object in the captured image. Then, the lens distortion correction section 202*c* carries out a curve fitting with respect to the points detected on the edge, and carries out the lens distortion correction based on a curvilineal expression.

FIG. 18 is a schematic view illustrating an example of the correction for the lens distortion of the captured image data The lens distortion correction section 202*c* detects the edge points of the detected image capture object and classifies, like the captured image determination section 103, the edge points into four groups which correspond to four sides of the image capture object (see solid lines in FIG. 18). Subsequently, the lens distortion correction section 202*c* carries out a quadratic curve approximation with respect to the edge points which belong to each of the four groups. Four quadratic curves thus determined with respect to the respective four groups correspond to the respective four sides of the image capture object. In addition, the lens distortion correction section 202*c* finds four intersections of the four quadratic curves which intersections correspond to corner sections of a region defined by the four quadratic curves. Next, the lens distortion correction section 202*c* finds a bound box (see one-dot chain lines in FIG. 18) in which the four quadratic curves found for the respective four sides are circumscribed, and which is similar to a quadrangle (see dotted lines in FIG. 18) defined by connecting the four intersections. Then, the lens distortion correction section 202*c* carries out a transformation with respect to the location of pixels in a region where the image capture object is located in the captured image so that the edge pixels of the image capture object which has been corrected are located on the sides of the bound box. Such a transformation can be carried out by carrying out calculations in accordance with vectors from a reference point (e.g., the centroid of the region where the image capture object is located). This allows the lens distortion, due to the image capture section 102 of the portable terminal apparatus 100, to be corrected.

Figure 19:
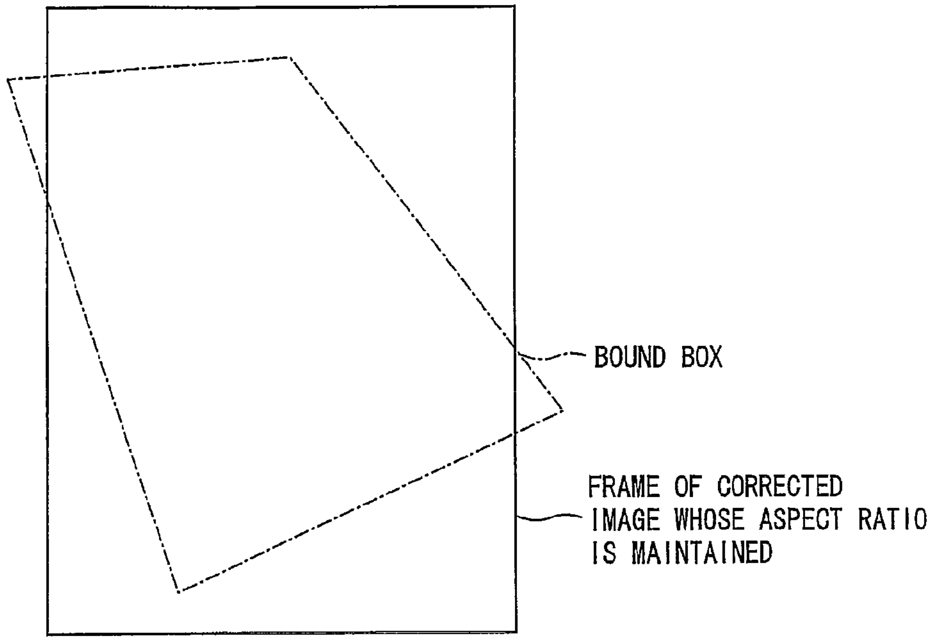
FIG. 19 is a schematic view illustrating an example of a correction for the geometric distortion of captured image data which correction is carried out by the geometric correction section illustrated in FIG. 13.

FIG. 19 is a schematic view illustrating an example of the correction for the geometric distortion of the captured image data. The geometric correction section 202*b* carries out the geometric distortion correction as below. The geometric correction section 202*b* can carry out a similar mapping transformation with respect to the bound box, which has been found as described above, in accordance with an aspect ratio (e.g., 7:10 in the case of A-/B-size used when outputting a business document) of the image capture object (see FIG. 19). A publicly-known technique can be used as the mapping transformation. Note that the geometric correction section 202*b* can carry out the mapping transformation in accordance with an aspect ratio stored in the storage section 210 or an aspect ratio entered from the input section 206.

Note that methods for the lens distortion correction and the geometric distortion correction are not limited to the above methods and that publicly-known techniques can be employed for the corrections. Note also that the lens distortion correction and the geometric distortion can be individually or concurrently carried out. Alternatively, the lens distortion correction and the geometric distortion can be carried out together with the super resolution process (described later).

The image processing section 202 can carry out the process for rotating the captured image data in accordance with the angle of the skew which angle is received from the portable terminal apparatus 100 so that the skew of the captured image has the angle of 0 (zero) degree.

(7-4) Super Resolution Correction

The image processing section 202 causes the super resolution processing section 202*d* to carry out the super resolution correction with respect to the plurality of pieces of the captured image data, so as to prepare one (1) high resolution image. For example, the super resolution process can be carried out in accordance with the ML (Maximum-likelihood) method, in which a square error between (i) a pixel value of an observed low resolution image which pixel value is estimated from a high resolution image vector h and (ii) a pixel value f of an actually observed low resolution image is an evaluation function, so as to search for the high resolution image vector h which minimizes the evaluation function. Assuming that a point spread function kernel vector PSF estimates the pixel value of the observed low resolution image from the high resolution image vector h, the evaluation function is represented by the following equation (9).

[Math. 9]

$$\text{Evaluation function} = \sum_{n=1}^{N}\sum_{y=0}^{height}\sum_{x=0}^{width}|f_N(x, y) - PSF(x, y)\times h| \qquad \text{Equation (9)}$$

In the equation (9), “width” and “height” represent a horizontal length and a vertical length, respectively of the low resolution image and N represents the number of captured low resolution images. Note that calculation carried out in the equation (9) refers to calculation convolution. Note here that it is desirable that the point spread function kernel PSF be obtained from an image capturing characteristic (a camera model) unique to the portable terminal apparatus 100 and be based on the point spread function. As for a method for preparing the high resolution image in accordance with the plurality of pieces of the captured image data, several methods are disclosed in the Journal of the Institute of Image Information and Television Engineers Vol. 62, No. 3, pp. 337 through 342 (published in 2008).

(8) Image Processing Method Carried Out in the Captured Image Processing System

A flow of processes carried out in the captured image processing system is described below with reference to FIG. 1. FIG. 1 is a flow chart illustrating the captured image processing method carried out in the captured image processing system. (a) of FIG. 1 illustrates a flow in the portable terminal apparatus 100, and (b) of FIG. 1 illustrates a flow in the image output apparatus 200.

First, the portable terminal apparatus 100 receives a selection of an image capture mode. Here, the user selects the text image capture mode in a case where the user (i) carries out image capture with respect to a rectangular image capture object shape such as paper on which a text image is printed or a display screen on which the text image is displayed and (ii) wishes the image output apparatus 200 to output captured image data which has been subjected to the high resolution correction.

In the portable terminal apparatus 100 which has received the selection of the text image capture mode, the control section 110 controls the display section 106 to display a window which urges the user to enter, from the input section 107, a magnification of resolution conversion required for the super resolution correction. This allows the control section 110 to obtain the magnification which the user entered from the input section 107. The control section 110 determines, in accordance with the magnification, (i) the number of times of image capture carried out by the image capture section 102 and (ii) a part of the process execution requirements which is used in the captured image determination section 103. In addition to the determination, the control section 110 starts the motion detection section 101. Further, the control section 110 controls the display section 106 to display a window which urges the user to enter, from the input section 107, (i) a kind of an output process and (ii) a setting requirement for carrying out the output process. This allows the control section 110 to obtain output process information entered from the input section 107.

When detecting a shutter click, the image capture section 102 consecutively carries out image capture as many times as the control section 110 sets (S10).

Next, the image processing section 104 carries out at least the A/D conversion process with respect to a plurality of pieces of captured image data (multiple captured image data). Then, the captured image determination section 103 determines whether or not the plurality of pieces of captured image data which have been subjected to the A/D conversion process meet the process execution requirements (S11). Note that details of how to determine and items to be determined are as described earlier, for example, in (4).

In accordance with the motion information of the portable terminal apparatus 100 which information is supplied from motion detection section 101, the control section 110 finds total velocities $V_t$ at which the respective plurality of pieces of captured image data are captured, so as to determine whether or not it was possible to obtain a required number of pieces of the captured image data which pieces have been captured at lower total velocities $V_t$ than a given threshold. Note that a method for the determination is specifically described earlier in, for example, (5-2).

In a case where the captured image determination section 103 or the control section 110 determines that no process execution requirements are met (NO in S11), the control section 110 controls the display section 106 to display a message urging image capture to be carried out again, so that the user is notified of the message (S12). In a case where even an image which has been captured again meets no determination items as mentioned above, the portable terminal apparatus 100 repeatedly carries out steps S10 through S12.

In contrast, in a case where the captured image determination section 103 or the control section 110 determines that the process execution requirements are met (YES in S11), in order from a piece of the captured image data which is obtained at a low total velocity $V_t$, the control section 110 preferentially selects a given number of pieces of the captured image data to be transmitted to the image output apparatus 200 (S13). Assuming that a piece of the captured image data which piece has been captured at the lowest total velocity $V_t$ is a reference image, the control section 110 finds traveling distances of the respective selected pieces of the captured image data from the reference image, so as to cause the motion information to include the found traveling distances.

Then, the control section 110 enters file names for the respective selected pieces of captured image data (S14). Note that the control section 110 can automatically enter, for the respective selected pieces of captured image data, (a) different file names (e.g., serial numbers which vary in accordance with image capture date and time) or (b) file names entered from the input section 106. Thereafter, the control section 110 transfers, to the communication section 104, the selected pieces of captured image data and the motion information, for which the file names are entered, together with (i) the information on the model of the portable terminal apparatus 100 and the user information which are stored in the storage section 108 and (ii) the output process information. Then, the communication section 105 transmits these pieces of information to the image output apparatus 200 (S15).

Note that the control section 110 temporarily can save, in the storage section 109 or a memory card, the captured image data for which the file names are entered, and then transfer the captured image data to the communication section 105 and to the image output apparatus 200, together with the information on the model of the portable terminal apparatus 100, the user information, and the output process information.

Next, the first communication section 207 of the image output apparatus 200 receives, from the portable terminal apparatus 100, the plurality of pieces of captured image data, the motion information, the information on the model of the portable terminal apparatus 100, the user information, and the output process information (S20).

After receiving the pieces of information and data, the image processing section 202 estimates an affine transformation coefficient in accordance with the motion information, so as to carry out the positioning process by use of the estimated affine transformation coefficient (S21) (see the description of (7-1)). Further, the image processing section 202 carries out the color balance correction, the contrast correction, and the brightness correction with respect to the plurality of pieces of the captured image data which have been subjected to the positioning process (S22) (see the description of (7-2). Then, the image processing section 202 carries out the lens distortion correction and the geometric correction (S23) (see the description of (7-3)). Thereafter, the image processing section 202 carries out the super resolution process with respect to the plurality of pieces of the captured image data, so as to prepare a high resolution image data (S24) (see the description of (7-4)) and then to output the high resolution image data to the control section 212.

Note that, as described earlier, the lens distortion correction and the geometric correction are carried out by detecting the edge points of the image capture object in the captured image data. Therefore, it is preferable to carry out in advance the color balance correction, the contrast correction, and the brightness correction with respect to the captured image data before carrying out the lens distortion correction and the geometric correction. This allows the edge points of the image capture object to be accurately detected in the lens distortion correction and the geometric correction.

The control section 212 controls the storage section 210 to store the captured image data processed by the image processing section 202 (S25).

Subsequently, the control section 212 determines whether or not an output instruction to output the captured image data is entered from the input section 206 (S26). In a case where no output instruction is entered (NO in S26), the control section 212 waits for the output instruction to be entered.

In contrast, in a case where the output instruction is entered (YES in S26), the certifying section 203 controls the display section 205 to display a window urging user information (such as a user ID and a password) to be entered from the input section 206. This allows the user information to be entered from the input section 206. Then, the certifying section 203 carries out user certification (S27). Note that the certifying section 203 can alternatively obtain the user information from a non-contact IC card possessed by the user with the use of a non-contact IC card reader/writer included in the image output apparatus 200.

During the user certification, the certifying section 203 (i) compares the user information entered from the input section 206 with the user information received from the portable terminal apparatus 100 and (ii) determines whether or not these pieces of information match each other (S28). In a case where the image output apparatus 200 receives, from the portable terminal apparatus 100, the user information which matches the user information entered from the input section 206 (YES in S28), the control section 212 controls the output process to be carried out in accordance with the output process information received from the portable terminal apparatus 100 (S29). For example, in a case where the output process information is indicative of the printing process, the control section 212 supplies, to the image forming section 204, an instruction to carry out the printing process. Thereafter, the processing flow is ended.

In contrast, the user information entered from the input section 206 does not match the user information received from the portable terminal apparatus 100 (NO in S28), the certifying section 203 determines whether or not the certification is carried out not less than a given times (S30). In a case where the certification is carried out less than the given times (NO in S30), S27 and S28 processes are repeated. In a case where the certification is carried out not less than the given times (YES in S30), the processing flow is ended with no output.

As described earlier, according to the present embodiment, a given number of pieces of the captured image data in which fewer image blurs occur are selected in accordance with the motion information obtained from the motion which is detected by the motion detection section 101 and in which the portable terminal apparatus 100 moves in the three-dimensional directions during the image capture, and the positioning process is carried out by estimating the affine transformation efficient. Therefore, such a positioning process can be carried out in a shorter time than the conventional positioning process in which only a parallel displacement component is estimated. This can realize a captured image processing system which allows high resolution image data to be prepared from a plurality of pieces of captured image data at a higher speed and with greater accuracy.

(9) Modifications

The captured image processing system of the present invention is not limited to the description of the embodiment above, but can be variously modified. An example of a modified embodiment is described below.

(9-1) Notification to User

The above description discusses the arrangement in which the portable terminal apparatus 100 determines whether or not the captured image data is applicable (see the description of (5-2)). However, the present invention is not limited to this. For example, the portable terminal apparatus 100 need not determine whether or not the captured image data is applicable.

Figure 20:
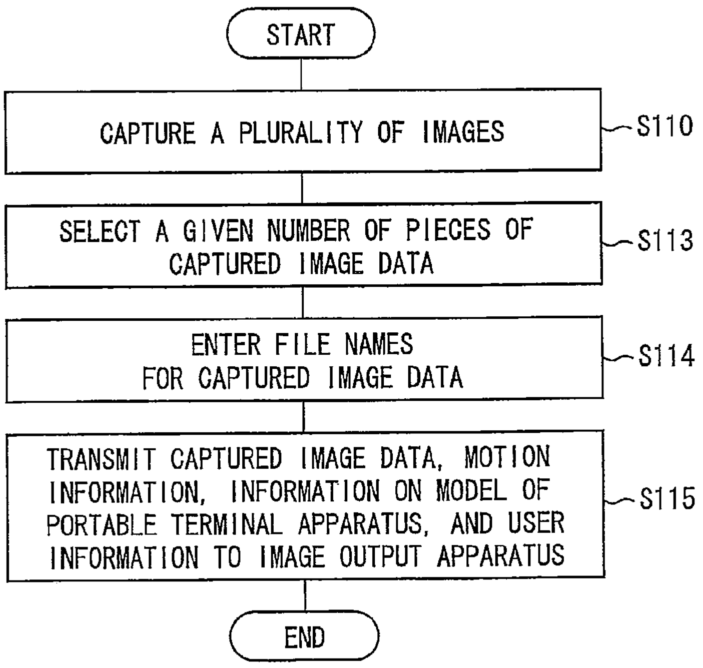
FIG. 20 is a flow chart illustrating a modification of the captured image processing method of the present embodiment which method is carried out by a portable terminal apparatus.

FIG. 20 is a flow chart illustrating a modification of the captured image processing method of the present embodiment which method is carried out by the portable terminal apparatus 100. The captured image processing method can be arranged such that the step of determining whether or not the captured image data is applicable is omitted, so that the user is not notified of need to capture an image again (see FIG. 20). Note that also in this case, the control section 110 preferentially selects a given number of pieces of the captured image data in order from a piece of the captured image data which piece has been captured at a low total velocity $V_t$ (S113).

(9-2) Selection of Captured Image Data

The present embodiment discusses the arrangement in which the reference image is set in the image output apparatus 200 by the portable terminal apparatus 100 and a given number of pieces of the captured image data which are preferentially selected in order from a piece of the captured image data which piece has been captured at a low total velocity $V_t$. However, the present invention is not limited to this. For example, the present invention can be arranged such that all the captured image data and the motion information including the motion velocities and the angular velocity which are detected by the motion detection sensor are transmitted to the image output apparatus 200, in which the captured image data for use in the positioning process are selected. Such an arrangement simplifies the function of the portable terminal apparatus 100, so that a processing load is lighter. This can make the portable terminal apparatus 100 smaller and lighter.

(9-3) Output Process Information

The above description discusses an arrangement in which the portable terminal apparatus 100 obtains and transmits the output process information to the image output apparatus 200. However, an arrangement is not limited to this. The image output apparatus 200 can obtain the output process information (the information indicative of the kind of the output process and the setting requirement for the output process) when obtaining the user information so as to carry out the user certification.

(9-4) Output Process

Before carrying out the filing process or the e-mail transmission process, the control section 212 of the image output apparatus 200 can convert, to a high-compression PDF, the captured image data processed by the image processing section 202. Note that the high-compression PDF refers to PDF data in which the image data is separated into a background part and a text part and optimum compression processes are carried out with respect to the respective parts. This allows favorable readability and a reduction in size of an image file.

Alternatively, before carrying out the filing process or the e-mail transmission process, the control section 212 can carry out an OCR (Optical Character Recognition) process with respect to the captured image data processed by the image processing section 202 so as to prepare text data. The control section 212 can convert the captured image data to a PDF, and then add the text data to the PDF as a transparent text. Note that the transparent text is data for superimposing (embedding) a recognized text on (in) the image data as text information so that the recognized text is apparently invisible. For example, an image file in which a transparent text is added to image data is generally used in a PDF file. Then, the control section 212 can cause PDF data, to which the prepared transparent text is added, to be outputted. This allows an output of an electronic document easy to utilize as if it were a file in which a text search can be carried out.

(9-5) Image Processing Section of the Image Output Apparatus

The above description discusses an arrangement in which the image processing section 202 of the image output apparatus 200 carries out corrections including the super resolution correction. Instead, the image output apparatus 200 can cause a server including an image processing section 202 to carry out, with respect to the captured image data, the super resolution correction and the other image processing such as the geometric distortion correction, the lens distortion correction, the contrast correction, and the color balance correction. Note, in this case, that the server will serve as an image output apparatus for carrying out the super resolution correction with respect to the captured image data received from the portable terminal apparatus 100, and for outputting the captured image data which has been subjected to the super resolution correction.

(9-6) Contents of Motion Information

The above description discusses the case in which the traveling distance, the rotation angle, the traveling distance from the reference image, etc. are found so as to cause them to constitute the motion information. However, contents of information which are used as the motion information can be selectable. According to this, it is possible to select an appropriate processing method in accordance with a processing capacity of the portable terminal apparatus 100, a volume of the captured image data, etc.

(10) Program and Recording Medium

The present invention can be achieved by recording, on a computer-readable recording medium in which a program to be executed by a computer is recorded, a method in which the image captured by the portable terminal apparatus 100 is transmitted to and outputted by the image output apparatus 200.

This makes it possible to portably provide a recording medium in which program codes (an executable program, an intermediate code program, and a source program) for carrying out the above process are recorded. Note, in the present embodiment, that the recording medium can be a memory (not illustrated) such as a ROM or the recording medium itself can be a program medium (not illustrated) because the process is carried out by a microcomputer. Alternatively, the recording medium can be a program medium from which the program codes can be read out by carrying out loading of a recording medium with respect to a program reading device provided as an external storage apparatus (not illustrated).

In any case, an arrangement can be employed in which a stored program is executed by access of a microprocessor. Alternatively, in any case, a system can be employed in which the program codes are read out and downloaded on a program storage area (not illustrated) of the microcomputer, and then the program is executed. The program for the downloading is stored in a main body in advance.

Note here that the program medium is a recording medium which is arranged to be detachable from the main body. The program medium can also be a medium which fixedly bears the program codes. Examples of such a program medium include (i) tapes such as a magnetic tape and a cassette tape, (ii) disks including magnetic disks such as a flexible disk and a hard disk, and optical disks such as a CD-ROM, an MO, an MD, and a DVD, (iii) cards such as an IC card (including a memory card) and an optical card, and (iv) semiconductor memories realized by a mask ROM, EPROM (Erasable Programmable Read Only Memory), EEPROM (Electrically Erasable Programmable Read Only Memory), a flash ROM, and the like.

Further, the present embodiment has a system architecture which is connectable to a communication network including the Internet. As such, the recording medium can be a medium which bears the program codes in a flexible manner so that the program codes are downloaded from the communication network. Note that, in a case where the program is downloaded from the communication network as described above, the program for the downloading can be stored beforehand in the main body or can be installed from an alternative recording medium. Note that the present invention can also be realized in a form of a computer data signal in which the program codes are embodied by an electronic transmission and which is embedded in carrier waves.

The recording medium is read by a program scanning device included in the portable terminal apparatus 100 or the image output apparatus 200, whereby the image processing method is carried out.

(11) (Summary of Embodiments)

As described earlier, a captured image processing system of the present embodiment includes: a portable terminal apparatus; and an image output apparatus, the portable terminal apparatus transmitting, to the image output apparatus, a plurality of pieces of captured image data captured by the portable terminal apparatus, the image output apparatus outputting high resolution image data prepared in accordance with the plurality of pieces of captured image data received from the portable terminal apparatus or outputting an image displayed based on the high resolution image data, the portable terminal apparatus including: an image capture section for capturing images of an identical object consecutively more than once; a motion detection section for detecting a change in position of the portable terminal apparatus relative to the identical object whose images are being captured, the change occurring while the images are being captured; and a transmission section for transmitting, to the image output apparatus, (i) a plurality of pieces of captured image data obtained from the image capture carried out by the image capture section consecutively more than once and (ii) motion information on the change in position which change has been detected by the motion detection section for each of the plurality of pieces of captured image data, the image output apparatus including: a receiving section for receiving, from the portable terminal apparatus, the plurality of pieces of captured image data and the motion information; a positioning processing section for carrying out, in accordance with the motion information received by the receiving section, a positioning process in which a coordinate conversion is carried out with respect to the plurality of pieces of captured image data received by the receiving section so that the identical object in each of the plurality of pieces of captured image data is positionally adjusted; a super resolution processing section for preparing, by use of the plurality of pieces of captured image data which have been subjected to the coordinate conversion, high resolution image data which has a higher resolution than the plurality of pieces of captured image data; and an output section for outputting the high resolution image data prepared by the super resolution processing section or outputting an image displayed based on the high resolution image data.

A method of the present embodiment for controlling a captured image processing system, the captured image processing system including: a portable terminal apparatus; and an image output apparatus, the portable terminal apparatus transmitting, to the image output apparatus, a plurality of pieces of captured image data captured by the portable terminal apparatus, the image output apparatus outputting high resolution image data prepared in accordance with the plurality of pieces of captured image data received from the portable terminal apparatus or outputting an image displayed based on the high resolution image data, the method comprising the steps of: (a) capturing images of an identical object consecutively more than once; (b) detecting a change in position of the portable terminal apparatus relative to the identical object whose images are being captured, the change occurring while the images are being captured; (c) transmitting, to the image output apparatus, (i) a plurality of pieces of captured image data obtained from the image capture carried out in the step (a) consecutively more than once and (ii) motion information on the change in position which change has been detected in the step (b) for each of the plurality of pieces of captured image data, (d) receiving, from the portable terminal apparatus, the plurality of pieces of captured image data and the motion information; (e) carrying out, in accordance with the motion information received in the step (d), a positioning process in which a coordinate conversion is carried out with respect to the plurality of pieces of captured image data received in the step (d) so that the identical object in each of the plurality of pieces of captured image data is positionally adjusted; (f) preparing, by use of the plurality of pieces of captured image data which have been subjected to the coordinate conversion, high resolution image data which has a higher resolution than the plurality of pieces of captured image data; and (g) outputting the high resolution image data prepared in the step (f) or outputting an image displayed based on the high resolution image data, the steps (a) through (c) being carried out by the portable terminal apparatus and the steps (d) through (g) being carried out by the image output apparatus.

According to the embodiment, the portable terminal apparatus causes the transmission section to transmit, to the image output apparatus, (i) a plurality of pieces of captured image data obtained from the image capture carried out by the image capture section and (ii) motion information on the change in position which change has been detected by the motion detection section for each of the plurality of pieces of captured image data.

Further, the image output apparatus receives, from the portable terminal apparatus, the plurality of pieces of captured image data and the motion information. Then, the image output apparatus causes the positioning processing section to carry out, in accordance with the received motion information, a positioning process in which an affine transformation coefficient is estimated, so as to carry out a coordinate conversion so that the identical object in each of the plurality of pieces of captured image data is positionally adjusted. In addition, the image output apparatus causes the super resolution processing section to prepare, by use of the plurality of pieces of captured image data which have been subjected to the coordinate conversion by the positioning processing section, high resolution image data which has a higher resolution than the plurality of pieces of captured image data. Thereafter, the image output apparatus causes the output section to output the high resolution image data prepared or an image displayed based on the high resolution image data.

As described earlier, according to the embodiment, the positioning processing section carries out, in accordance with the motion information on the change in position which change has been detected by the motion detection section and by use of an affine transformation coefficient, a positioning process in which a coordinate conversion is carried out with respect to the plurality of pieces of captured image data received by the receiving section so that the identical object in each of the plurality of pieces of captured image data is positionally adjusted. Therefore, such a positioning process can be carried out in a shorter time and with greater accuracy than the conventional positioning process which is carried out by use of a correlation between captured image data.

This can realize a captured image processing system which allows preparation of high resolution image data from a plurality of pieces of captured image data at a higher speed and with greater accuracy.

The captured image processing system of the present embodiment is preferably arranged such that the motion detection section detects, as the change in position of the portable terminal apparatus, (i) a change in position in directions of a first axis and a second axis each of which directions is parallel to a light detecting surface of the image capture section and (ii) a change in position in a direction of a third axis which direction is perpendicular to the light detecting surface.

According to the embodiment, the motion detection section detects, as the change in position of the portable terminal apparatus, (i) a change in position in directions of a first axis and a second axis each of which directions is parallel to a light detecting surface of the image capture section and (ii) a change in position in a direction of a third axis which direction is perpendicular to the light detecting surface, i.e., a change in position of the portable terminal apparatus in three-dimensional directions.

According to this, high resolution image data is prepared from a plurality of pieces of captured image data in accordance with motion information on the change in position of the portable terminal apparatus in three-dimensional directions. This allows the preparation to be carried out with greater accuracy.

The captured image processing system of the present embodiment is preferably arranged such that the motion detection section detects, as the change in position of the portable terminal apparatus, at least one of (i) motion velocities in the directions of the first, second, and third axes, (ii) an angular velocity of rotation about the third axis, (iii) accelerations in the directions of the first, second, and third axes, and (iv) an angular acceleration of rotation about the third axis.

According to the embodiment, the motion detection section detects, as the change in position of the portable terminal apparatus, at least one of (i) motion velocities in the directions of the first, second, and third axes, (ii) an angular velocity of rotation about the third axis, (iii) accelerations in the directions of the first, second, and third axes, and (iv) an angular acceleration of rotation about the third axis. This allows an easy detection of the change in position of the portable terminal apparatus during the image capture.

This allows preparation of high resolution image data from a plurality of pieces of captured image data at a higher speed.

The captured image processing system of the present embodiment is preferably arranged such that: the portable terminal apparatus includes an image selecting section for selecting, in accordance with the change in position detected by the motion detection section, a given number, which is not less than 2, of pieces of captured image data from the plurality of pieces of captured image data obtained from the image capture carried out by the image capture section consecutively more than once, the given number, which is not less than 2 of pieces of captured image data including a piece of captured image data which piece the portable terminal apparatus has captured at its lowest motion velocity; and the transmission section transmits, to the image output apparatus, the given number of pieces of captured image data selected by the image selecting section and the motion information which is in association with each of the given number of pieces of captured image data.

According to the embodiment, the portable terminal apparatus includes an image selecting section for selecting, in accordance with the change in position detected by the motion detection section, a given number, which is not less than 2, of pieces of captured image data from the plurality of pieces of captured image data obtained from the image capture carried out by the image capture section consecutively more than once, the given number, which is not less than 2, of pieces of captured image data including a piece of captured image data which piece the portable terminal apparatus has captured at its lowest motion velocity. Then, the portable terminal apparatus transmits, to the image output apparatus, the given number, which is not less than 2, of pieces of captured image data selected by the image selecting section.

This allows (i) a processing load on the image output apparatus to be lighter and (ii) the transmission section to transmit the captured image data in a shorter time.

The captured image processing system of the present embodiment is preferably arranged such that: the image output apparatus includes an image selecting section for selecting, in accordance with the motion information received by the receiving section, a given number, which is not less than 2, of pieces of captured image data from the plurality of pieces of captured image data received by the receiving section, the given number, which is not less than 2, of pieces of captured image data including a piece of captured image data which piece the portable terminal apparatus has captured at its lowest motion velocity; the positioning processing section carries out the positioning process with respect to the given number of pieces of captured image data selected by the image selecting section; and the super resolution processing section prepares the high resolution image data by use of the given number of pieces of captured image data which have been subjected to the positioning process.

According to the embodiment, the image output apparatus includes an image selecting section for selecting, in accordance with the change in position detected by the motion detection section, a given number, which is not less than 2, of pieces of captured image data from the plurality of pieces of captured image data obtained from the image capture carried out by the image capture section consecutively more than once, the given number, which is not less than 2, of pieces of captured image data including a piece of captured image data which piece the portable terminal apparatus has captured at its lowest motion velocity.

This simplifies the function of the portable terminal apparatus and thus makes the portable terminal apparatus smaller and lighter.

The captured image processing system of the present embodiment is preferably arranged such that the image selecting section selects the given number of pieces of captured image data which pieces the portable terminal apparatus has captured at low motion velocities.

According to the embodiment, the image selecting section selects the given number of pieces of captured image data which pieces the portable terminal apparatus has captured at low motion velocities. Therefore, pieces of captured image data in which relatively fewer image blurs occur are preferentially selected. Then, the positioning processing section and the super resolution processing section carry out their respective given processes with respect to the selected pieces of captured image data in which relatively fewer image blurs occur.

This allows preparation of high resolution image data from a plurality of pieces of captured image data with greater accuracy.

The captured image processing system of the present embodiment is preferably arranged such that, assuming that, of the given number of pieces of captured image data selected by the image selecting section, the piece of captured image data which piece the portable terminal apparatus has captured at its lowest motion velocity is a reference image, the transmission section causes the motion information to include a traveling distance of the portable terminal apparatus from a time point at which the reference image is captured to a time point at which each of the given number of pieces of captured image data is captured.

According to the embodiment, assuming that, of the given number of pieces of captured image data selected by the image selecting section, the piece of captured image data which piece the portable terminal apparatus has captured at its lowest motion velocity is a reference image, the transmission section causes the motion information to include a traveling distance of the portable terminal apparatus from a time point at which the reference image is captured to a time point at which each of the given number of pieces of captured image data is captured, so as to transmit the motion information to the image output apparatus. This allows the positioning processing section to carry out the positioning process in accordance with the traveling distance of the portable terminal apparatus from a time point at which the reference image is captured to a time point at which each of the given number of pieces of captured image data is captured.

This allows the positioning process to be carried out between the captured image data in a shorter time.

The captured image processing system of the present embodiment can be arranged such that: the motion detection section detects, as the change in position of the portable terminal apparatus, (i) motion velocities of the portable terminal apparatus in directions of a first axis and a second axis each of which directions is parallel to a light detecting surface of the image capture section, (ii) a motion velocity of the portable terminal apparatus in a direction of a third axis which direction is perpendicular to the light detecting surface, and (iii) an elapsed time from a given reference time point; and the transmission section causes the motion information to include the motion velocities and the elapsed time which have been detected by the motion detection section.

According to the embodiment, the motion detection section detects, as the change in position of the portable terminal apparatus, (i) motion velocities of the portable terminal apparatus in directions of a first axis and a second axis each of which directions is parallel to a light detecting surface of the image capture section, (ii) a motion velocity of the portable terminal apparatus in a direction of a third axis which direction is perpendicular to the light detecting surface, and (iii) an elapsed time from a given reference time point. The transmission section causes the motion information to include the change in position of the portable terminal apparatus as it is, so as to transmit the motion information to the image output apparatus. This allows the portable terminal apparatus to merely associate, with the captured image data, a detected result received from the motion detection section, so as to transmit, to the image output apparatus, the detected result and the captured image data which are associated with each other.

This simplifies the function of the portable terminal apparatus and thus makes the portable terminal apparatus smaller and lighter.

The captured image processing system of the present invention is preferably arranged such that: the motion detection section further detects an angular velocity of rotation about the third axis; and the transmission section causes the motion information to include the angular velocity detected by the motion detection section.

According to the embodiment, the motion detection section further detects, as the change in position of the portable terminal apparatus, an angular velocity of rotation about the third axis, and the transmission section causes the motion information to include the angular velocity, so as to transmit the motion information to the image output apparatus.

This simplifies the function of the portable terminal apparatus and thus makes the portable terminal apparatus smaller and lighter. This also allows preparation of high resolution image data from a plurality of pieces of captured image data with greater accuracy.

The captured image processing system of the present invention is preferably arranged such that the transmission section selects, in accordance with an input by a user, (I) a first piece of information indicating (i) motion velocities of the portable terminal apparatus in directions of a first axis and a second axis each of which directions is parallel to a light detecting surface of the image capture section, (ii) a motion velocity of the portable terminal apparatus in a direction of a third axis which direction is perpendicular to the light detecting surface, and (iii) an elapsed time from a given reference time point or (II) a second piece of information indicating traveling distances of the portable terminal apparatus in the directions of the first, second, and third axes from the given reference time point, so as to cause the motion information to include the selected information.

According to the embodiment, the user can appropriately select (I) a first piece of information indicating (i) motion velocities of the portable terminal apparatus in directions of a first axis and a second axis each of which directions is parallel to a light detecting surface of the image capture section, (ii) a motion velocity of the portable terminal apparatus in a direction of a third axis which direction is perpendicular to the light detecting surface, and (iii) an elapsed time from a given reference time point or (II) a second piece of information indicating traveling distances of the portable terminal apparatus in the directions of the first, second, and third axes from the given reference time point.

This allows a captured image processing system to appropriately carry out processing in accordance with a processing capacity of the portable terminal apparatus, a volume of the captured image data, etc.

The captured image processing system of the present invention is preferably arranged such that the transmission section causes the first piece of information to include information indicating an angular velocity of rotation about the third axis and causes the second piece of information to include information indicating a rotation angle of the portable terminal apparatus about the third axis from the given reference time point.

According to the embodiment, the first piece of information includes information indicating an angular velocity of rotation about the third axis, and the second piece of information includes information indicating a rotation angle of the portable terminal apparatus about the third axis from the given reference time point. This allows a detection of the change in position of the portable terminal apparatus due to its rotation about the third axis, so as to cause the motion information to include the change in position.

This allows a captured image processing system to more appropriately carry out processing in accordance with a processing capacity of the portable terminal apparatus, a volume of the captured image data, etc. This can also realize a captured image processing system which allows preparation of high resolution image data from a plurality of pieces of captured image data with greater accuracy.

Note that it is possible to cause a computer to realize each section included in a control apparatus of the present embodiment. In this case, (i) a control program for causing the computer to function as each section included in the control apparatus and (ii) a computer-readable recording medium in which the program is recorded are both encompassed in the scope of the present embodiment.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is applicable to a captured image processing system for carrying out data communication between a portable terminal apparatus and an image output apparatus.

| Reference Signs List | |
|---|---|
| 100 | Portable terminal apparatus |
| 101 | Motion detection section |
| 102 | Image capture section |
| 103 | Captured image determination section |
| 104 | Image processing section |
| 105 | Communication section (Transmission section) |
| 106 | Display section |
| 107 | Input section |
| 108 | Storage medium accessing section |
| 109 | Storage section |
| 110 | Control section (Image selecting section, Motion determination section) |
| 200 | Image output apparatus |
| 202 | Image processing section |
| 202e | Positioning processing section |
| 202d | Super resolution processing section |
| 204 | Image forming section (Output section) |
| 205 | Display section |
| 206 | Input section |
| 207 | First communication section (Receiving section) |
| 208 | Second communication section (Output section) |
| 212 | Control section |

The invention claimed is:

1. A captured image processing system comprising:

a portable terminal apparatus; and an image output apparatus, the portable terminal apparatus transmitting, to the image output apparatus, a plurality of pieces of captured image data captured by the portable terminal apparatus, the image output apparatus outputting high resolution image data prepared in accordance with the plurality of pieces of captured image data received from the portable terminal apparatus or outputting an image displayed based on the high resolution image data, the portable terminal apparatus including:

an image capture section for capturing images of an identical object consecutively more than once;

a motion detection section for detecting a change in position of the portable terminal apparatus relative to the identical object whose images are being captured, the change occurring while the images are being captured; and a transmission section for transmitting, to the image output apparatus, (i) a plurality of pieces of captured image data obtained from the image capture carried out by the image capture section consecutively more than once and (ii) motion information on the change in position which change has been detected by the motion detection section for each of the plurality of pieces of captured image data, the image output apparatus including:

a receiving section for receiving, from the portable terminal apparatus, the plurality of pieces of captured image data and the motion information;

a positioning processing section for carrying out, in accordance with the motion information received by the receiving section, a positioning process in which a coordinate conversion is carried out with respect to the plurality of pieces of captured image data received by the receiving section so that the identical object in each of the plurality of pieces of captured image data is positionally adjusted;

a super resolution processing section for preparing, by use of the plurality of pieces of captured image data which have been subjected to the coordinate conversion, high resolution image data which has a higher resolution than the plurality of pieces of captured image data; and an output section for outputting the high resolution image data prepared by the super resolution processing section or outputting an image displayed based on the high resolution image data, wherein the portable terminal apparatus includes an image selecting section for selecting, in accordance with the change in position detected by the motion detection section, a given number, which is not less than 2, of pieces of captured image data from the plurality of pieces of captured image data obtained from the image capture carried out by the image capture section consecutively more than once, the given number, which is not less than 2, of pieces of captured mage data including a piece of captured image data which piece the portable terminal apparatus has captured at its lowest motion velocity; and the transmission section transmits, to the image output apparatus, the given number of pieces of captured image data selected by the image selecting section and the motion information which is in association with each of the given number of pieces of captured image data.

2. The captured image processing system as set forth in claim 1, wherein the motion detection section detects, as the change in position of the portable terminal apparatus, (i) a change in position in directions of a first axis and a second axis each of which directions is parallel to a light detecting surface of the image capture section and (ii) a change in position in a direction of a third axis which direction is perpendicular to the light detecting surface.

3. The captured image processing system as set forth in claim 2, wherein the motion detection section detects, as the change in position of the portable terminal apparatus, at least one of (i) motion velocities in the directions of the first, second, and third axes, (ii) an angular velocity of rotation about the third axis, (iii) accelerations in the directions of the first, second, and third axes, and (iv) an angular acceleration of rotation about the third axis.

4. The captured image processing system as set forth in claim 1, wherein the image selecting section selects the given number of pieces of captured image data which pieces the portable terminal apparatus has captured at to low motion velocities.

5. The captured image processing system as set forth in claim 1, wherein, assuming that, of the given number of pieces of captured image data selected by the image selecting section, the piece of captured image data which piece the portable terminal apparatus has captured at its lowest motion velocity is a reference image, the transmission section causes the motion information to include a traveling distance of the portable terminal apparatus from a time point at which the reference image is captured to a time point at which each of the given number of pieces of captured image data is captured.

6. A captured image processing system comprising:

a portable terminal apparatus; and an image output apparatus, the portable terminal apparatus transmitting, to the image output apparatus, a plurality of pieces of captured image data captured by the portable terminal apparatus, the image output apparatus outputting high resolution image data prepare to accordance with the plurality of pieces of captured image data received from the portable terminal apparatus or outputting an image displayed based on the high resolution image data, the portable terminal apparatus including:

an image capture section for capturing images of an identical object consecutively more than once;

a motion detection section for detecting a change in position of the portable terminal apparatus relative to the identical object whose images are being captured, the change occurring while the images are being captured; and a transmission section for transmitting, to the image output apparatus, (i) a plurality of pieces of captured image data obtained from the image capture carried out by the image capture section consecutively more than once and (ii) motion information on the change in position which change has been detected by the motion detection section for each of the plurality of pieces of captured image data, the image output apparatus including:

a receiving section for receiving, from the portable terminal apparatus, the plurality of pieces of captured image data and the motion information;

a positioning processing section for carrying out, in accordance with the motion information received by the receiving section, a positioning process a coordinate conversion is carried out with respect to the plurality of pieces of captured image data received by the receiving section so that the identical object in each of the plurality of pieces of captured image data is positionally adjusted;

a super resolution processing section for preparing, by use of the plurality of pieces of captured image data which have been subjected to the coordinate conversion, high resolution image data which has a higher resolution than the plurality of pieces of captured image data; and an output section for outputting the high resolution image data prepared by the super resolution processing section or outputting an image displayed based on the high resolution image data, wherein the image output apparatus includes an image selecting section for selecting, in accordance with the motion information received by the receiving section, a given number, which is not less than 2, of pieces of captured image data from the plurality of pieces of captured image data received by the receiving section, the given number, which is not less than 2, of pieces of captured image data including a piece of captured image data which piece the portable terminal apparatus has captured at its lowest motion velocity;

the positioning processing section carries out the positioning process with respect to the given number of pieces of captured image data selected by the image selecting section; and the super resolution processing section prepares the high resolution image data by use of the given number of pieces of captured image data which have been subjected to the positioning process.

7. A captured image processing system comprising:

a portable terminal apparatus; and an image output apparatus, the portable terminal apparatus transmitting, to the image output apparatus, a plurality of pieces of captured image data captured by the portable terminal apparatus, the image output apparatus outputting high resolution image data prepared in accordance with the plurality of pieces of captured image data received from the portable terminal apparatus or outputting an image displayed based on the high resolution image data, the portable terminal apparatus including, an image capture section for capturing images of an identical object consecutively more than once;

a motion detection section for detecting a change in position of the portable terminal apparatus relative to the identical object whose images are being captured, the change occurring while the images are being captured; and a transmission section for transmitting, to the image output apparatus, (i) a plurality of pieces of captured image data obtained from the image capture carried out by the image capture section consecutively more than once and (ii) motion information on the change in position which change has been detected by the motion detection section for each of the plurality of pieces of captured image data, the image output apparatus including:

a receiving section for receiving, from the portable terminal apparatus, the plurality of pieces of captured image data and the motion information;

a positioning processing section for carrying out, in accordance with the motion information received by the receiving section, a positioning process in which a coordinate conversion is carried out with respect to the plurality of pieces of captured image data received by the receiving section so that the identical in each of the plurality of pieces of captured image data is positionally adjusted;

a super resolution processing section for preparing, by use of the plurality of pieces of captured image data which have been subjected to the coordinate conversion, high resolution image data which has a higher resolution than the plurality of pieces of captured image data; and an output section for outputting the high resolution image data prepared by the super resolution processing section or outputting an image displayed based on the high resolution image data, wherein the motion detection section detects, as the change in position of the portable terminal apparatus, (i) motion velocities of the portable terminal apparatus in directions of a first axis and a second axis each of which directions is parallel to a light detecting surface of the image capture section, (ii) a motion velocity of the portable terminal apparatus in a direction of a third axis which direction is perpendicular to the light detecting surface, and (iii) an elapsed time from a given reference time point; and the transmission section causes the motion information to include the motion velocities and the elapsed time which have been detected by the motion detection section.

8. The captured image processing system as set forth in claim 7, wherein:

the motion detection section further detects an angular velocity of rotation about the third axis; and the transmission section causes the motion information to include the angular velocity detected by the motion detection section.

9. A captured image processing system comprising:

a portable terminal apparatus; and an image output apparatus, the portable terminal apparatus transmitting, to the image output apparatus, a plurality of pieces of captured image data captured by the portable terminal apparatus, the image output apparatus outputting high resolution image data prepared in accordance with the plurality of pieces of captured image data received from the portable terminal apparatus or outputting an displayed based on the high resolution image data, the portable terminal apparatus including:

an image capture section for capturing images of an identical object consecutively more than once;

a motion detection section for detecting a change in position of the portable terminal apparatus relative to the identical object whose images are being captured, the change occurring while the images are being captured; and a transmission section for transmitting, to the image output apparatus, (i) a plurality of pieces of captured image data obtained from the image capture carried out by the image capture section consecutively more than once and (ii) motion information on the change in position which change has been detected by the motion detection section for each of the plurality of pieces of captured image data, the image output apparatus including:

a receiving section for receiving, from the portable terminal apparatus, the plurality of pieces captured image data and the motion information;

a positioning processing section for carrying out, in accordance with the motion information received by the receiving section, a positioning process in which a coordinate conversion is carried out with respect to the plurality of pieces of captured image data received by the receiving section so that the identical object in each of the plurality of pieces of captured image data is positionally adjusted;

a super resolution processing section for preparing, by use of the plurality of pieces of captured image data which have been subjected to the coordinate conversion, high resolution image data which has a higher resolution than the plurality of pieces of captured image data; and an output section for outputting the high resolution image data prepared by the super resolution processing section or outputting an image displayed based on the high resolution image data, wherein the transmission section selects, in accordance with an input by a user, (I) a first piece of information indicating (i) motion velocities of the portable terminal apparatus in directions of a first axis and a second axis each of which directions is parallel to a light detecting surface of the image capture section, (ii) a motion velocity of the portable terminal apparatus in a direction of a third axis which direction is perpendicular to the light detecting surface, and (iii) an elapsed time from a given reference time point or (II) a second piece of information indicating traveling distances of the portable terminal apparatus in the directions of the first, second, and third axes from the given reference time point, so as to cause the motion information to include the selected information.

10. The captured image processing system as set forth in claim 9, wherein the transmission section causes the first piece of information to include information indicating an angular velocity of rotation about the third axis and causes the second piece of information to include information indicating a rotation angle of the portable terminal apparatus about the third axis from the given reference time point.

11. A portable terminal apparatus which can communicate with an image output apparatus which outputs high resolution image data prepared in accordance with a plurality of pieces of captured image data received from the portable terminal apparatus or outputs an image displayed based on the high resolution image data, said portable terminal apparatus comprising:

an image capture section for capturing images of an identical object consecutively more than once;

a motion detection section for detecting a change in position of the portable terminal apparatus relative to the identical object whose images are being captured, the change occurring while the images are being captured; and a transmission section for transmitting, to the image output apparatus, (i) a plurality of pieces of captured image data obtained from the image capture carried out by the image capture section consecutively more than once and (ii) motion information on the change in position which change has been detected by the motion detection section for each of the plurality of pieces of captured image data, the motion detection section detecting, as the change in position of the portable terminal apparatus, (i) a change in position in directions of a first axis and a second axis each of which directions is parallel to a light detecting surface of the image capture section and (ii) a change in position in a direction of a third axis which direction is perpendicular to the light detecting surface, wherein the portable terminal apparatus includes an image selecting section for selecting, in accordance with the change in position detected by the motion detection section, a given number, which is not less than 2, of pieces of captured image data from the plurality of pieces of captured image data obtained from the image capture carried out by the image capture section consecutively more than once, the given number, which is not less than 2, of pieces of captured image data including a piece of captured image data which piece the portable terminal apparatus has captured at its lowest motion velocity; and the transmission section transmits, to the image output apparatus, the given number of pieces of captured image data selected by the image selecting section and the motion information which is in association with each of the given number of pieces of captured image data.

12. An image output apparatus which outputs high resolution image data prepared in accordance with a plurality of pieces of captured image data received from the portable terminal apparatus or outputs an image displayed based on the high resolution image data, said image output apparatus comprising:

a receiving section for receiving, from the portable terminal apparatus, the plurality of pieces of captured image data and the motion information on the change in position of the portable terminal apparatus relative to the identical object whose images are being captured;

a positioning processing section for carrying out, in accordance with the motion information received by the receiving section, a positioning process in which a coordinate conversion is carried out with respect to the plurality of pieces of captured image data received by the receiving section so that the identical object in each of the plurality of pieces of captured image data is positionally adjusted;

a super resolution processing section for preparing, by use of the plurality of pieces of captured image data which have been subjected to the coordinate conversion, high resolution image data which has a higher resolution than the plurality of pieces of captured image data; and an output section for outputting resolution image data prepared by the super resolution processing section or outputting an image displayed based on the high resolution image data, wherein the image output apparatus includes an image selecting section for selecting, in accordance with the motion information received by the receiving section, a given number, which is not less than 2, of pieces of captured image data from the plurality of pieces of captured image data received by the receiving section, the given number, which is not less than 2, of pieces of captured image data including a piece of captured image data which piece the portable terminal apparatus has captured at its lowest motion velocity;

the positioning processing section carries out the positioning process with respect to the given number of pieces of captured image data selected by the image selecting section; and the super resolution processing section prepares the high resolution image data by use of the given number of pieces of captured image data which have been subjected to the positioning process.

* * * * *